US006084167A

United States Patent [19]

Akimoto et al.

[11] Patent Number: 6,084,167

[45] Date of Patent: Jul. 4, 2000

[54] KEYBOARD INSTRUMENT WITH TOUCH RESPONSIVE DISPLAY UNIT

[75] Inventors: Teruo Akimoto, Tokyo; Kiyoshi Kawamura, Hamamatsu; Taro Kawabata, Hamamatsu; Yasuhiko Ohba, Hamamatsu; Tadaharu Kato, Hamamatsu; Masaaki Suzuki, Hamamatsu; Motoya Kondo, Hamamatsu; Hironori Osakabe, Hamamatsu, all of Japan

[73] Assignee: Yamaha Corporation, Hamamatsu, Japan

[21] Appl. No.: 08/934,105

[22] Filed: Sep. 19, 1997

[30] Foreign Application Priority Data

Sep. 11, 1997 [JP] Japan .................................... 9-216701
Sep. 27, 1997 [JP] Japan .................................... 8-256716

[51] Int. Cl.[7] .................................................... G09B 15/02

[52] U.S. Cl. ............................................ 84/477 R; 84/478

[58] Field of Search ......................... 84/600, 478, 477 R, 84/DIG. 6; 434/307 A

[56] References Cited

U.S. PATENT DOCUMENTS

| | | | |
|---|---|---|---|
| 5,027,689 | 7/1991 | Fujimori | 84/622 |
| 5,864,078 | 1/1999 | Koevering | 84/DIG. 6 X |
| 5,908,997 | 6/1999 | Arnold et al. | 84/478 X |

*Primary Examiner*—Jeffrey Donels
*Attorney, Agent, or Firm*—Graham & James LLP

[57] ABSTRACT

A keyboard instrument is configured such that a flat panel-like display unit such as a liquid crystal display for displaying character information and/or images is provided on an instrument main body and that speakers, a recording/reproducing unit for multi media such as sound and/or image recording media, a microphone and a "karaoke" reproduction unit are connected to the display unit so as to improve the function of displaying a notation and/or lyric at the time of a performance, a performance function such as an ensemble performance or "karaoke" performance, and a tuning function.

4 Claims, 18 Drawing Sheets simultaneous display
of mode 3 and mode 5 simultaneous display
of mode 1 and mode 2

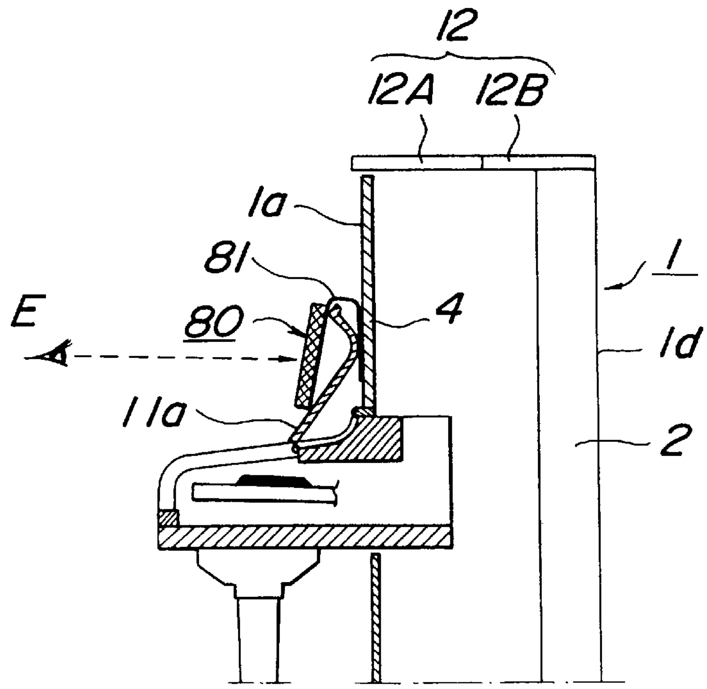
FIG. 24
FIG. 25
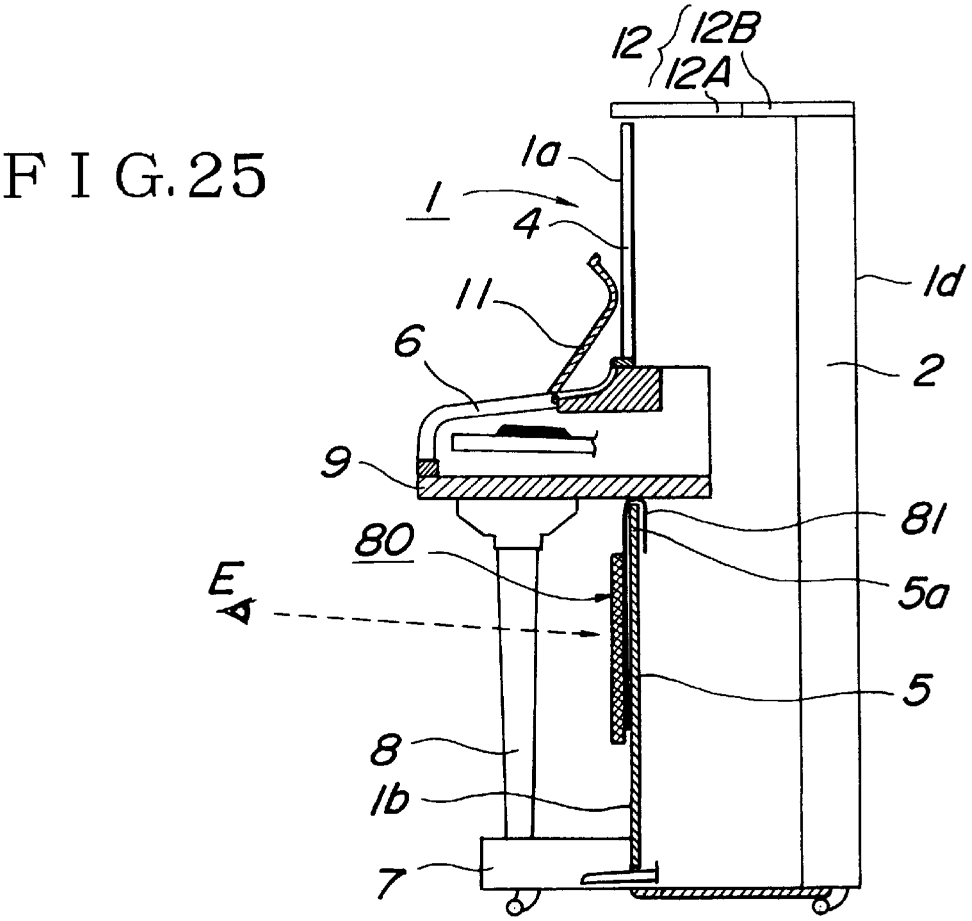

F I G. 26
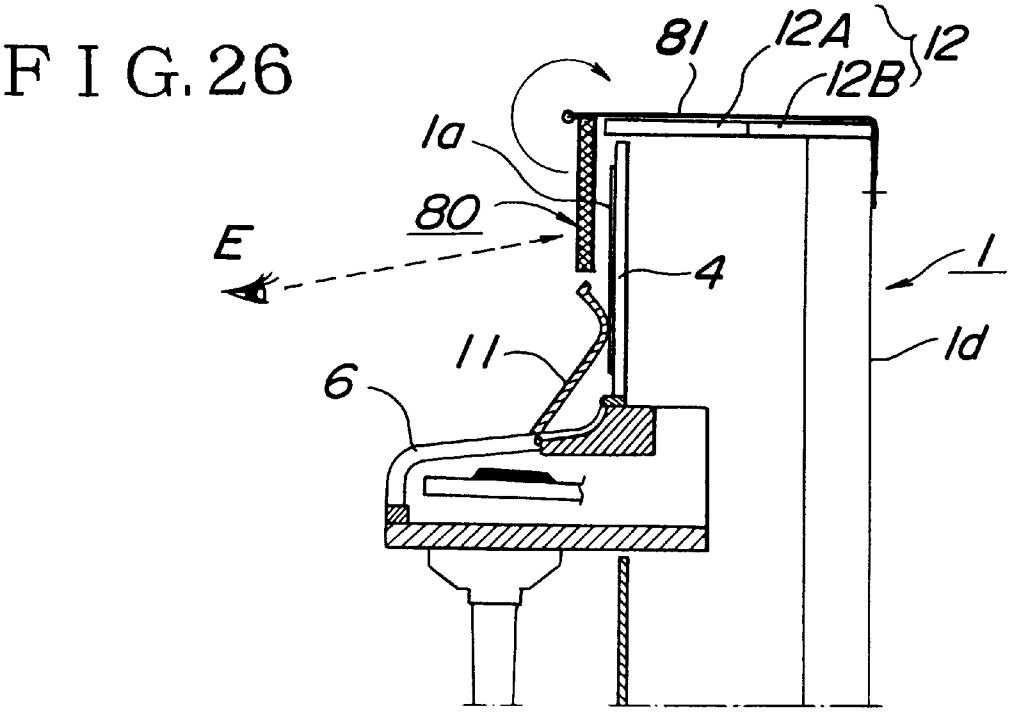
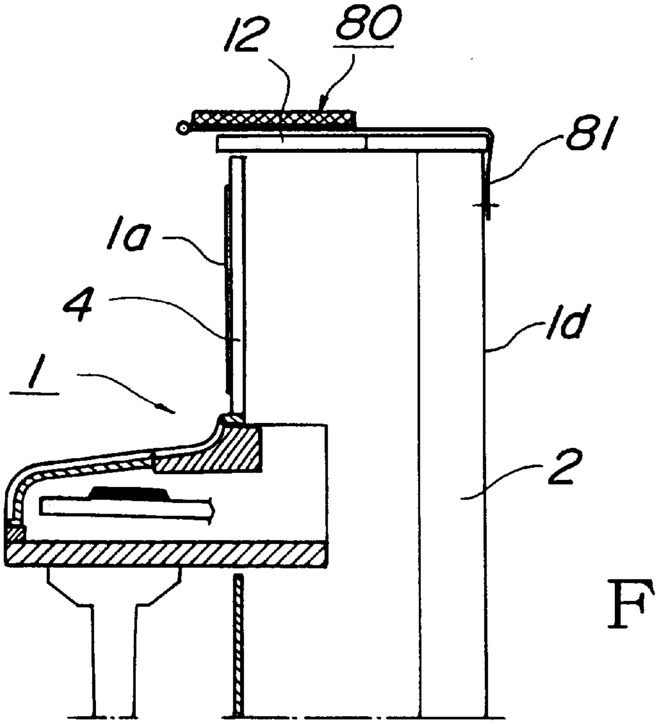
F I G. 27

KEYBOARD INSTRUMENT WITH TOUCH RESPONSIVE DISPLAY UNIT

BACKGROUND OF THE INVENTION

1. Field of the Invention

This invention relates to a keyboard instrument such as an upright piano, grand piano or electronic keyboard instrument. More specifically, it relates to a keyboard instrument which comprises a character information and/or image display function in an instrument main body to allow for large-sized screen display and improve a display function for notations and/or lyrics at the time of a performance, an ensemble or "karaoke" performance function and a tuning function.

2. Related Art

As disclosed in Laid-open Japanese Patent Application No. Hei 6-59967, there has been made available an upright piano which can be played as an electronic piano by combining a regular acoustic piano played by striking strings with an electronic sound source and incorporating speakers for producing sounds from the electronic sound source.

However, in the above conventional upright piano, sounds are produced from the speakers by combining an acoustic piano with an electronic sound source, or music is played by hearing sounds from the electronic sound source with a headphone by stopping string striking sounds. It is not designed to improve its functionality at the time of a performance by providing a display function such as a liquid crystal display (LCD).

SUMMARY OF THE INVENTION

It is an object of this invention to provide a keyboard instrument which is capable of improving a display function for notations and/or lyrics at the time of a performance, a ensemble or "karaoke" performance function and a tuning function.

To solve the above problem of the prior art, this invention provides a keyboard instrument comprising an instrument main body which is capable of switching among a regular performance function, automatic performance function and/or a muffling function and provided with a flat panel-like display unit for displaying character information and/or images. In this case, the display unit is connected to speakers, recording/reproducing unit for multi media such as music and/or image recording media, microphone and "karaoke" reproduction unit, comprises sound pick-up means for picking up string striking sounds of a string striking unit and has a tuning function by which the sound pitch of each key picked up by the sound pick-up means is compared with a standard sound pitch and the difference therebetween can be displayed on the display screen of the display unit.

BRIEF DESCRIPTION OF THE ACCOMPANYING DRAWINGS

The above and other objects and advantages of this invention will become clear from the following description with reference to the accompanying drawings, wherein:

FIG. 24 is a schematic sectional view of a ninth embodiment of this invention;

FIG. 25 is a schematic sectional view of a tenth embodiment of this invention;

FIG. 26 is a schematic sectional view of an eleventh embodiment of this invention;

FIG. 27 is a schematic sectional view of the upright piano not in use;

DETAILED DESCRIPTION OF THE PREFERRED EMBODIMENTS

Figure 1:
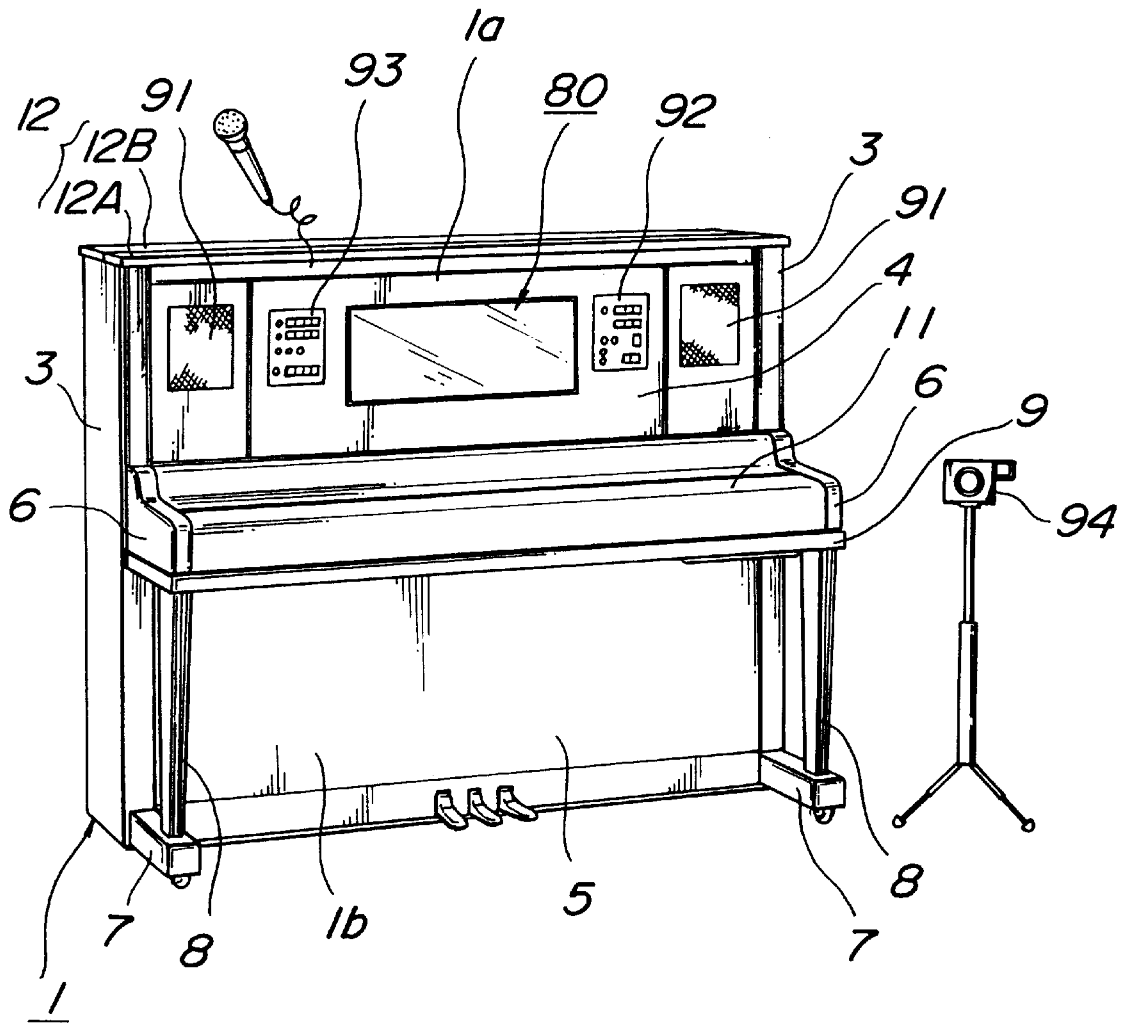
FIG. 1 is a diagram for explaining an upright piano as a keyboard instrument according to a first embodiment of this invention.
Figure 2:
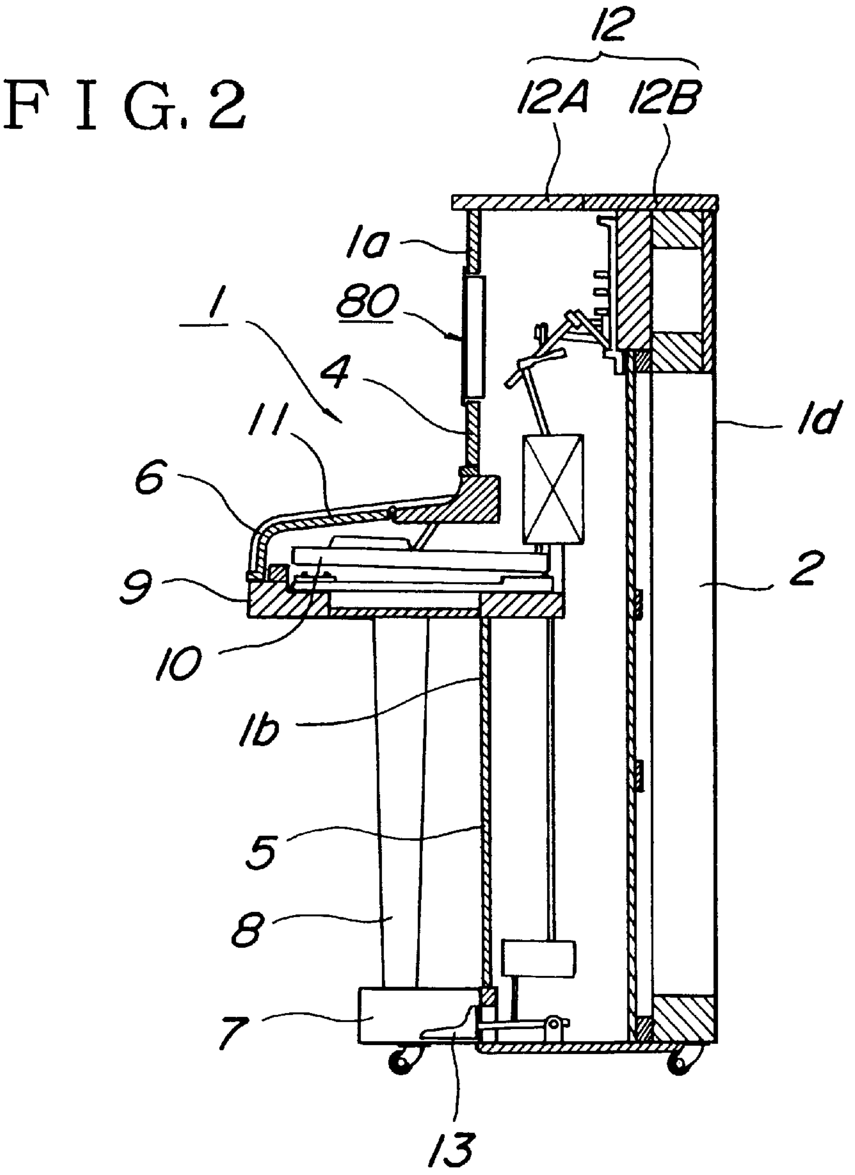
FIG. 2 is a sectional view of the upright piano.
Figure 3:
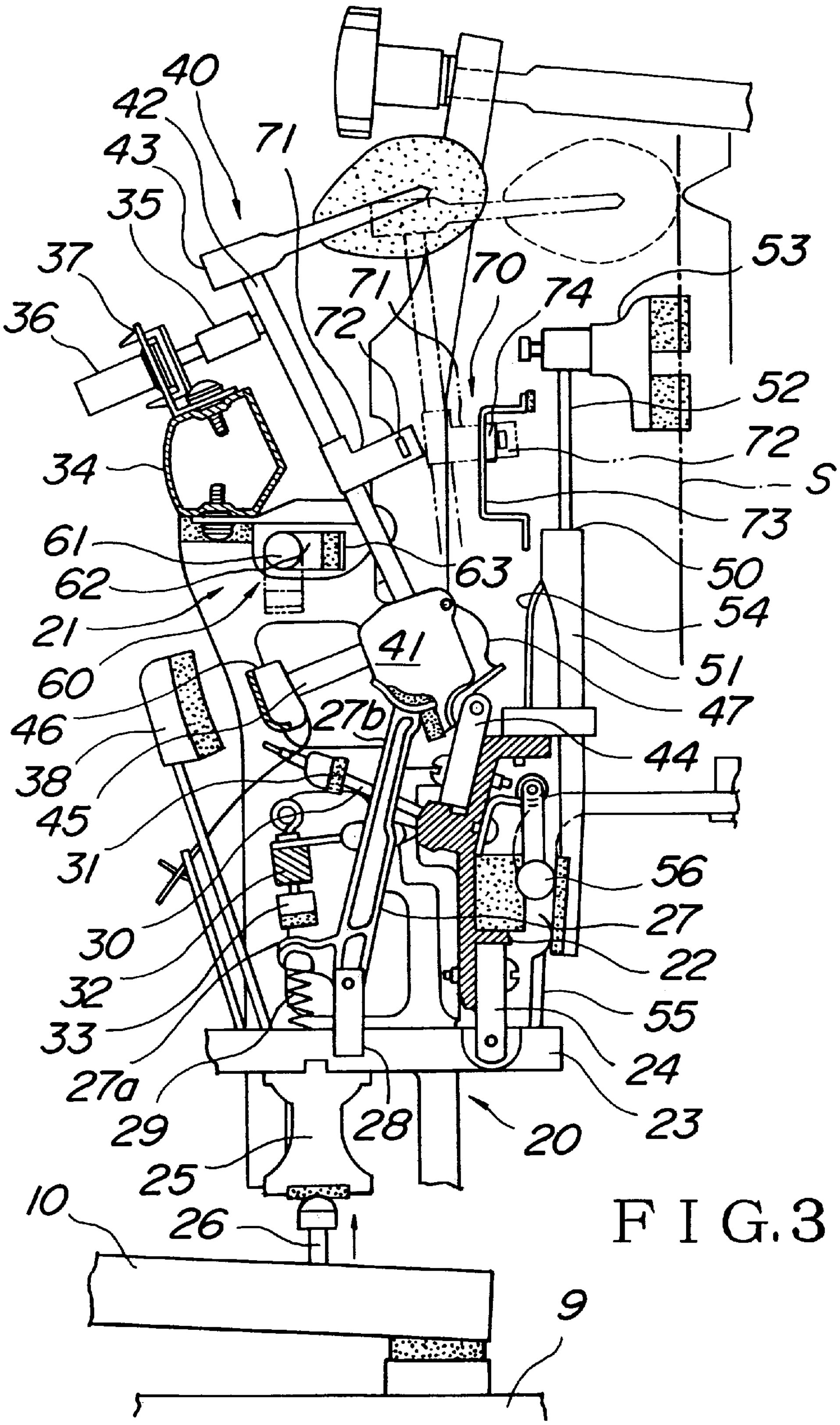
FIG. 3 is an enlarged sectional view of the string striking unit of the upright piano.

Preferred embodiments of this invention are described in detail with reference to the accompanying drawings. FIG. 1 to FIG. 3 show a keyboard instrument according to an embodiment of this invention such as an upright piano (upright keyboard instrument). Reference numeral 1 denotes a piano main body (musical instrument main body).

This piano main body 1 comprises a support frame 2 on the rear side, carrier plates 3, 3 arranged on the right and left sides of this support frame 2, an upper front plate 4 and a lower front plate 5 arranged on the front side between the carrier plates 3, 3, a keyboard 10 arranged on a shelf plate 9 supported by studs 8, 8 installed upright on bases 7, 7 between brackets 6, 6 located at an intermediate position between the upper and lower front plates 4, 5, a keyboard cover 11 which can open or close the top surface of the keyboard 10, and a roof plate 12 arranged on the top surface side between the carrier plates 3, 3. The roof plate 12 comprises a front roof plate 12A which can be opened upward or closed and a rear roof plate 12B fixed between the carrier plates 3, 3, and a string striking unit 20 connected to the keyboard 10 is stored under the roof plate 12.

In these figures, reference numeral 13 denotes a pedal for driving a damper rod 56 of a damper unit 50 to be described hereinafter of the string striking unit 20.

The string striking unit comprises, as shown in FIG. 3, a hammer assembly 40 for striking a string S which will be described hereinafter and the damper unit 50 for pressing the string S, and the frame thereof is formed by action brackets arranged at a plurality of locations on both sides and an intermediate portion of the piano main body 1 and a center rail 22 installed on the action brackets 21. A plate-like wippen 23 for each key of the keyboard 10 is movably attached to the center rail 22 through a wippen flange 24 and provided with a wippen heel 25. This wippen heel 25 is supported by a capstan 26 provided on the keyboard 10 to maintain the wippen 28 at substantially the horizontal initial position.

The wippen 23 supports a substantially L-shaped jack 27 through a jack flange 28 movably. This jack 27 is urged in a clockwise direction by a jack spring 29 and movement thereof is limited by a jack stop felt 31 which is attached to the center rail 22 through a jack stop rail 30 in such a manner that its position is adjustable.

Further, a regulating rail 32 which extends along the entire length in the key arranging direction of the keyboard 10 is installed on the center rail 22 and a regulating button 33 is provided on this regulating rail 32 in such a manner that position thereof is adjustable. A lower end porting 27*a* of the jack 27 is contacted to the regulating button 3 when the wippen 23 is moved to a predetermined location.

The hammer assembly 40 for striking the string S comprises a bat 41 which is a base portion, a hammer shank 42 which extends obliquely upward from the bat 41, and a hammer 43 provided at an upper end portion of this hammer shank 42. The bat 41 is movably attached to the center rail 22 through a bat flange 44 and a catcher shank 45 is attached to the bat 41 in such a manner that it is substantially perpendicular to the hammer shank 42 and a catcher 46 is attached to a top end portion of the catcher shank 45.

The bat 41 is urged in a counterclockwise wise direction by a bat spring 47 and a lower surface thereof is contacted to an upper end portion 27*b* of the jack 27.

Further, a hammer rail 34 which extends along the entire length in the key arranging direction of the keyboard 10 is attached to the action brackets 21 installed at a plurality of positions on both sides and an intermediate portion of the piano main body 1. A plunger 35 is provided on the hammer rail 34 through a holder 36 and a plunger bracket 37 for the hammer assembly 40 and is supported by the holder 36 in such a manner that it can be moved in an axial direction and its vibration can be absorbed.

In other words, the hammer shank 42 of the hammer 43 sprung back after striking a string is contacted to the plunger 35 and absorbs the kinetic energy of the hammer 43 to prevent the hammer shank 42 from springing back farther. In this case, the initial contact position between the plunger 35 and the hammer shank 42 is maintained by the urging force of the bat spring 47 for urging the bat 41 in a counterclockwise direction.

Reference numeral 38 in FIG. 3 denotes a back check installed on a free end side of the wippen 23. The back check 38 receives elastically the catcher 46 of the hammer assembly 40 which returns to the initial position to prevent the string S from being struck by the sprung back hammer assembly 40.

Meanwhile, the damper unit 50 for pressing the string S comprises a damper lever 51 whose intermediate portion in a vertical direction is movably supported by the center rail 22, a damper 53 installed on an upper end portion of the damper lever through a damper wire 52, a damper lever spring 54 for urging the damper lever 51 connected to the damper 53 in a clockwise direction movably, a damper spoon 55 attached to the wippen 23 in such a manner a lower end portion of the damper lever 51 is contacted to the wippen 23, and a damper rod 56 for driving all the dampers 53 in a direction that they part from the strings S in accordance with the operation of the pedal 13 of the piano main body 1. The damper 53 generally presses the string S to prevent it from resonating when another string S is struck.

That is, the damper unit 50 allows for a natural performance as follows. When the wippen 23 moves in a clockwise direction by pressing a key at the time of a performance, the damper spoon 55 moves the damper lever in a counterclockwise direction in defiance of the urging force of the damper spring 54, whereby the damper 53 is separated from the string S and a string striking sound is then produced by striking the string S with the hammer 43.

The upright piano as the keyboard instrument of this invention has an automatic performance function, a silent function for producing music sounds electrically from an electronic sound source by preventing strings from being struck by the hammers, a display function for displaying character information and/or images, speakers connected to the display function, a recording/reproduction function for multi media such as music and/or image recording media, a microphone, a "karaoke" reproduction function and an image pick-up function using a digital video camera or the like.

Figure 4:
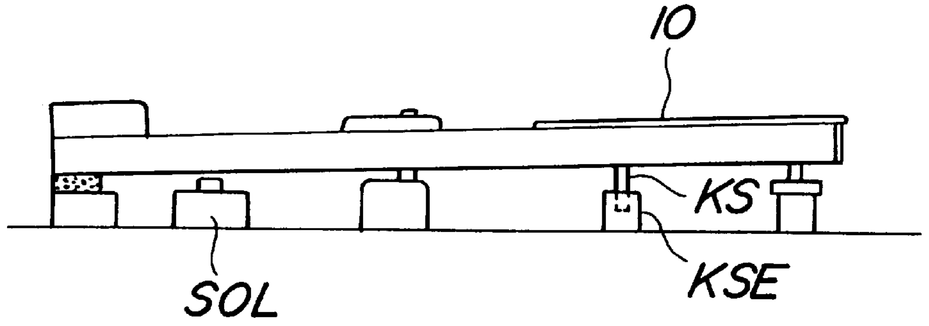
FIG. 4 is an enlarged sectional view of a key sensor unit of the keyboard of the upright piano.

The automatic performance function is, as shown in FIG. 4, obtained by using a solenoid SOL to drive the keyboard 10 under the control of a controller 200 which will be described hereinafter.

A shutter KS is provided under the keyboard 10, a key sensor KSE is provided on the top surface of the shelf plate 9 to face the shutter KS, and optical sensors (not shown) are provided in this key sensor KSE in a vertical direction with a predetermined distance therebetween.

When the key of the keyboard 10 is pressed, the shutter KS shades light from the upper optical sensor of the key sensor KSE and then from the lower optical sensor.

Conversely, when the key of the keyboard is released, the upper optical sensor can receive light and then the upper optical sensor can receive light. A key-off is detected based on the output signal of the key sensor KSE.

The silent function is, as shown in FIG. 3, obtained by a muffling unit 60 which comprises a shaft 61 which is driven by a motor M which is rotatably supported by the action brackets 21 arranged at a plurality of locations on both sides and an intermediate portion of the piano main body 1 and will be described hereinafter and a stopper 63 which is fixed to the outer peripheral surface of this shaft 61 through a spacer 62 and protected by a pad made from synthetic leather containing a cushion material such as felt.

The stopper 63 is directed in a substantially horizontal direction as shown by solid lines in FIG. 3 so that the regular movement of the catcher 46 of the hammer assembly 40 is allowed to enable a regular performance state. Meanwhile, the shaft 61 is driven by the motor M which will be described hereinafter to direct the stopper 53 substantially downward (shown by two-dot broken lines in FIG. 3) so that the catcher 46 of the hammer assembly 40 is contacted to the stopper 63 to prevent the hammer assembly 40 from moving farther. Thereby, the hammer 43 is prevented from striking the string S, whereby a silent performance state can be maintained.

Reference numeral 70 in FIG. 3 denotes a hammer sensor unit which is configured such that an L-shaped shutter 71 is provided in an intermediate portion of the hammer shank 42, a rectangular window hole 72 is formed in a top end portion of the shutter 71, a housing 73 having an U-shaped cross section installed on the action brackets 21 arranged at a plurality of positions on both sides and an intermediate portion of the piano main body 1 is disposed in a space between the hammer assembly 40 and the damper unit 50 in such a manner that it extends along the entire length in the key arranging direction of the keyboard 10. A slit (not shown) into which a top end portion of the shutter 71 can be inserted is formed in the side surface of the housing 73 and an optical sensor 74 is installed on the inner side of the housing 73 such that the slit is sandwiched between a light emitting unit and a light receiving unit.

Further, end surfaces of optical fibers having the same optical axis are exposed to the light emitting unit and the light receiving unit of the optical sensor 74 and other end surfaces of the optical fibers are arranged to face a light emitting element or a light receiving element provided in a controller 200 which will be described hereinafter. Thereby, light emitted from the light emitting element is guided to the light emitting unit through an optical fiber for light emission and a fixed amount of light is projected from the light emitting unit to the light receiving unit whereas light received by the light receiving unit is guided to the light receiving element through an optical fiber for light reception and the light reception state of the light receiving unit is detected.

In FIGS. 1 and 2, reference numeral 80 denotes a display unit for displaying character information and/or images controlled by the controller 200 which will be described hereinafter. This display unit 80 is formed of a flat panel-like liquid crystal display (LCD: 211) and is set in a central portion of the upper front plate 4 forming the upper front surface 1*a* of the piano main body 1.

Speakers 91 (SP), a recording/reproducing unit for multi media such as music and/or image recording media 92 (213), an external microphone and a "karaoke" reproduction unit 93 are arranged on right and left side portions of the display unit 80 set in the upper front plate 4 of the piano main body 1 and connected to the display unit 80 through the controller 200. A digital video camera 94 (215) as an image pick-up device and a headphone 95 (HH) are also provided.

Figure 5:
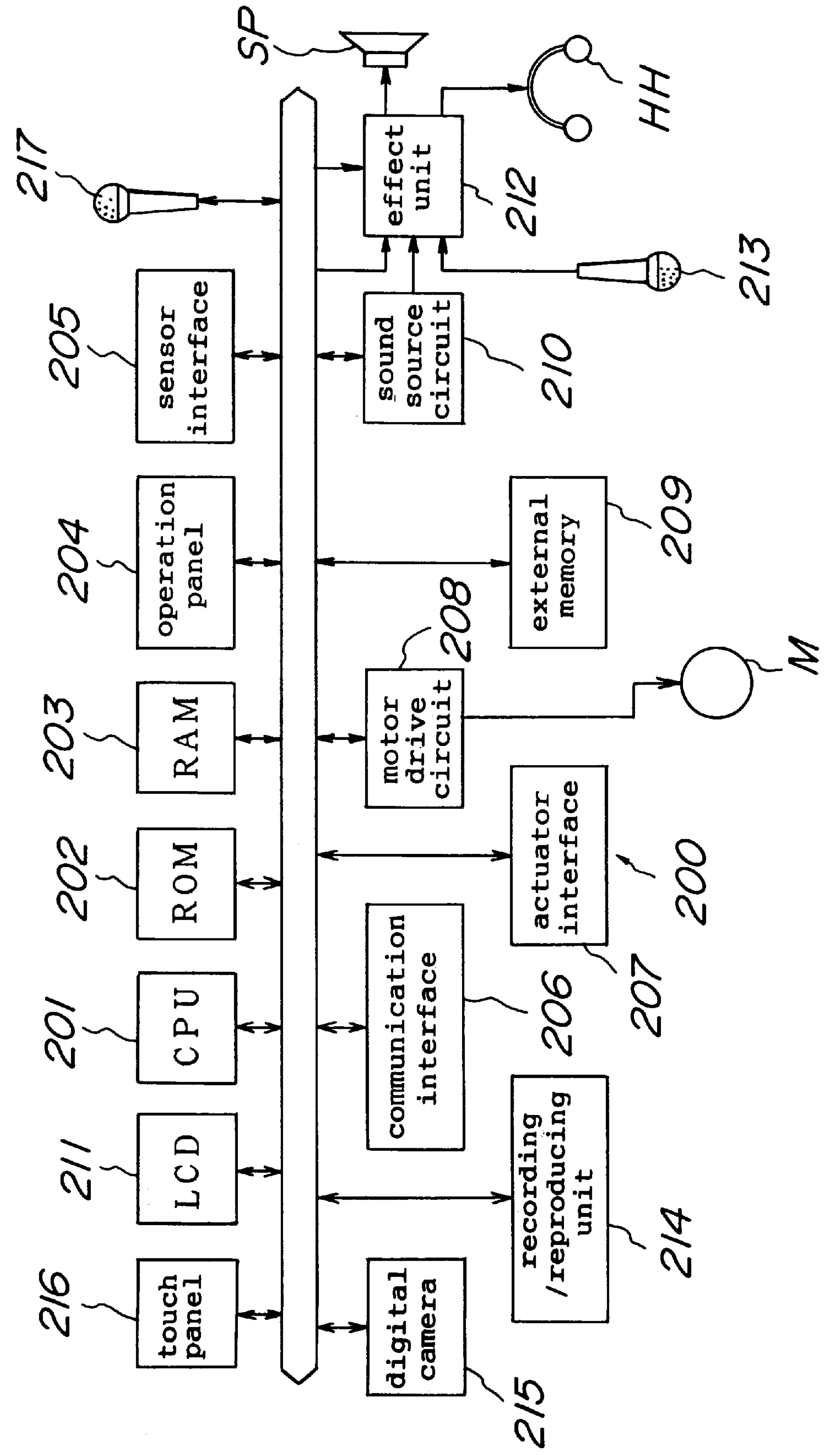
FIG. 5 is a block diagram of a controller of the upright piano.

That is, the controller 200, as shown in FIG. 5, comprises a CPU 201 for controlling each component of the instrument, a ROM 202 for storing a program to be used in the CPU 201, and a RAM 203 for temporarily storing data. This RAM 203 is used as a control data memory area used for control carried out by the CPU 201.

The controller 200 comprises an operation panel 204 for controlling operation, a sensor interface 205 for outputting a signal indicative of the light receiving state of the optical sensor 74 provided for each hammer shank 42 and a communication interface 206. This communication interface 206 has a MIDI terminal, a connection terminal for an external device such as a personal computer, a connection terminal for a communication circuit such as a telephone circuit and the like and transmits and receives a MIDI event to and from an external device.

Further, the controller 200 comprises an actuator interface 207 for supplying an exciting current to the solenoid SOL for driving the keyboards 10 under the control of the CPU 201, a motor drive circuit 208 for driving the motor M for rotating the shaft 61 of the muffling unit 60 under the control of the CPU 201 to switch between regular performance state and silent performance state, and an external memory 209. This external memory 209 reads performance data (MIDI data) from a sound and/or image recording medium such as a compact disk, transfers and records it in a predetermined area of the RAM 203 and writes the performance data recorded in the predetermined area of the RAM 203 to a recording medium under the control of the CPU 201.

Further, the controller 200 comprises a sound source circuit 210 for synthesizing instrumental signals indicative of performance data (MIDI data) supplied from the CPU 201 and an effect unit 212 connected to the speakers SP and/or the headphone HH. Music signals generated by the sound source circuit 210 are output to the speakers and/or headphone HH through the effect unit 212. The effect unit 212 is connected to the external microphone 213 for "karaoke" use to add such an effect as an echo and/or reverberation to voice and/or instrumental signals input from the external microphone 213 and/or the sound source circuit 210.

The controller 200 comprises a recording/reproducing unit 214 for recording and/or reproducing a video or DVD image signal, voice signal or audio signal. An image signal from this recording/reproducing unit 214 can be displayed on the LCD 211 and a sound signal or audio signal for the image signal is input into the effect unit 212 to add such an effect as an echo and/or reverberation to the signal and output the added signal from the speakers SP and/or headphone HH. In this case, when a voice sound is input from the external microphone 213, a "karaoke" performance can be given.

Further, the controller 200 comprises an image pick-up device such as a digital video camera or the like. An image picked up by this image pick-up device 215 is recorded in the recording/reproducing unit 214 or displayed on the LCD 211.

Moreover, the controller 200 comprises a transparent touch panel 216 set on the surface of the LCD 211. This touch panel 216 has a function to carry out the same operation control as that of the operation panel by touch operation so that operation can be carried out while looking at an image displayed on the LCD 211.

The controller 200 comprises an internal microphone 217. Since the internal microphone 217 is incorporated in the piano main body 1, it picks up a string striking sound and transfers and records this sound data in a predetermined area of the RAM 203. The sound data recorded in the predetermined area of the RAM 203 under the control of the CPU 201 is compared with the standard pitch of each key of the keyboard 10 prerecorded in the ROM 202 and the difference of pitch is displayed on the LCD 211, whereby tuning convenience is improved.

The CPU 201 identifies which key of the keyboard 10 is operated based on a signal supplied from the sensor interface 205, calculates a string striking timing Ht and a string striking speed Hv based on the output of the hammer sensor, identifies key-off timing based on the signal of the key sensor KSE received from the sensor interface 205 and generates MIDI data on each event from these performance data. Thus, an automatic performance and/or silent performance is given based on the MIDI data under the control of the CPU 201.

Figure 6:
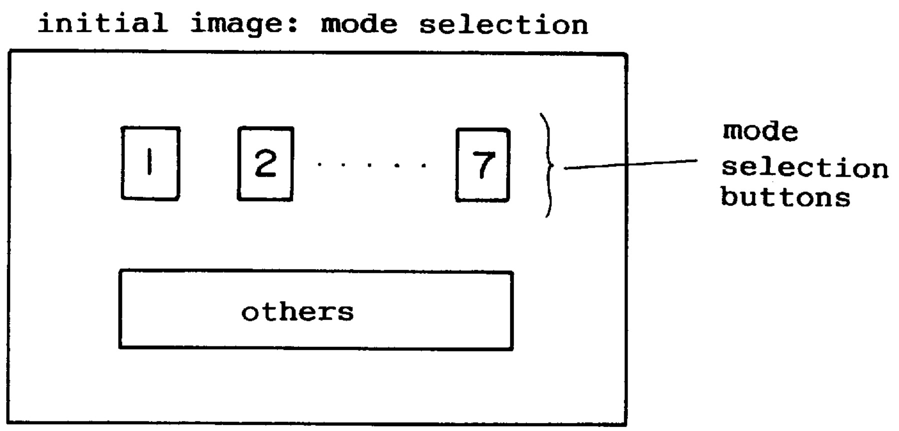
FIG. 6 is a diagram showing an initial image displayed on a display unit.

In the control of each operation on the display screen of the display unit 80, as shown in FIG. 6, various modes such as "mode 1: automatic performance", "mode 2: silent", "mode 3: display of notation", "mode 4: karaoke", "mode 5: practice", "mode 6: communication", "mode 7: tuning" and "mode: others" are displayed on the screen as "<initial image: mode selection>" in the first stage.

Figure 7:
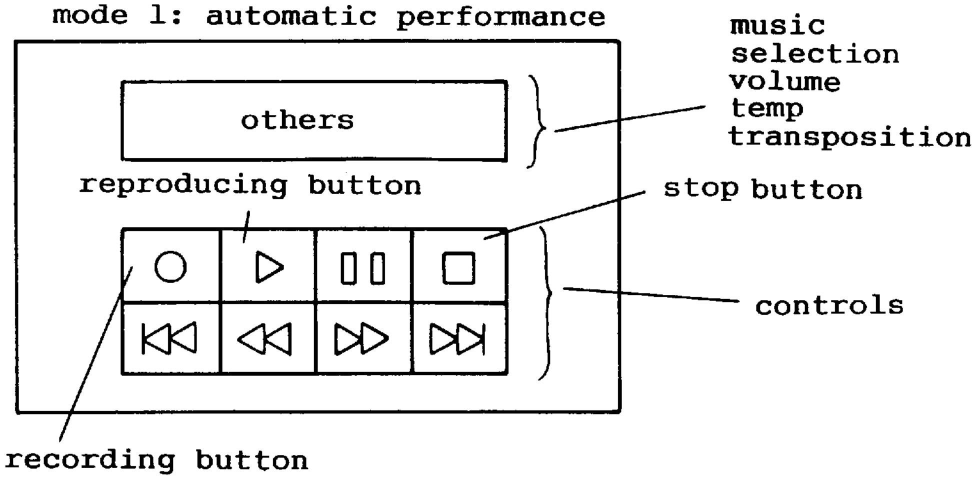
FIG. 7 is a diagram showing an image for automatic performance mode on the display unit.

Thereafter, when a selection button for "mode 1: automatic performance", for example, is selected from the initial image by touching it, an image for "<mode 1: automatic performance>" as shown in FIG. 7, for example, a selection button for "others" such as "music selection, sound volume, rhythm, transposition . . . " and selection buttons for controls such as "recording, reproduction, stop, winding, rewinding, . . . " indicated by marks are displayed. When the "recording button", for example, is pressed, a player's playing of the keyboard is detected by the key sensor KSE, the hammer sensor unit 80 and the like, and this information is recorded in the external memory 209 of the controller 200 as performance data. When a selection button for "others" is pressed, various settings for automatic performance such as "music selection, sound volume, rhythm, transposition, . . . " can be made.

Figure 8:
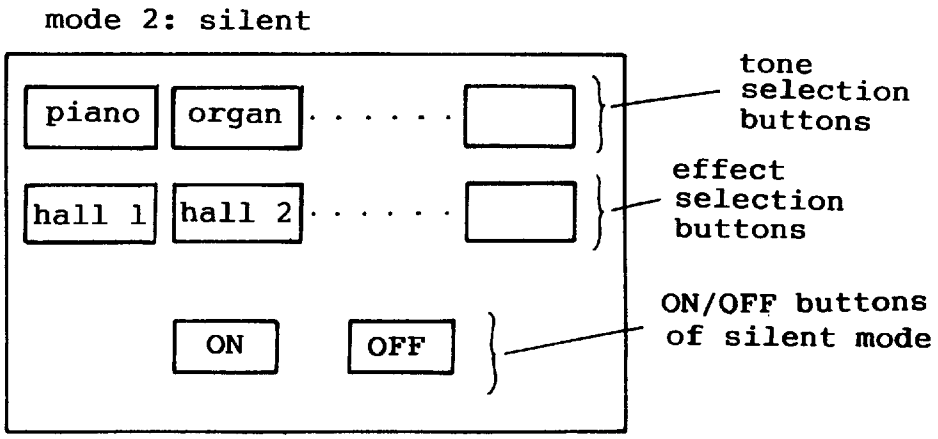
FIG. 8 is a diagram showing an image for silent performance mode on the display unit.

When a selection button for "mode 2: silent" is selected from "<initial image: mode selection>" by touching it, an image for "<mode 2: silent>" as shown in FIG. 8, for example, tone selection buttons for "piano, organ, . . . ", effect selection buttons for "hall 1, hall 2, . . . " and silent selection buttons for "ON" and "OFF" are displayed. By ON/OFF operation with the silent selection buttons, a regular performance and/or automatic performance given by striking strings or silent performance given by stopping striking strings is specified, whereby the motor M of the muffling unit 60 is automatically driven to switch to regular performance and/or automatic performance or silent performance.

In this case, by selecting a tone selection button, the tone of a musical sound signal generated by the sound source circuit 210 of the controller 200 is selected and by selecting an effect selection button, such an effect as an echo and/or reverberation to be added to a musical sound signal by the effect unit 212 of the controller 200 is selected.

Figure 9:
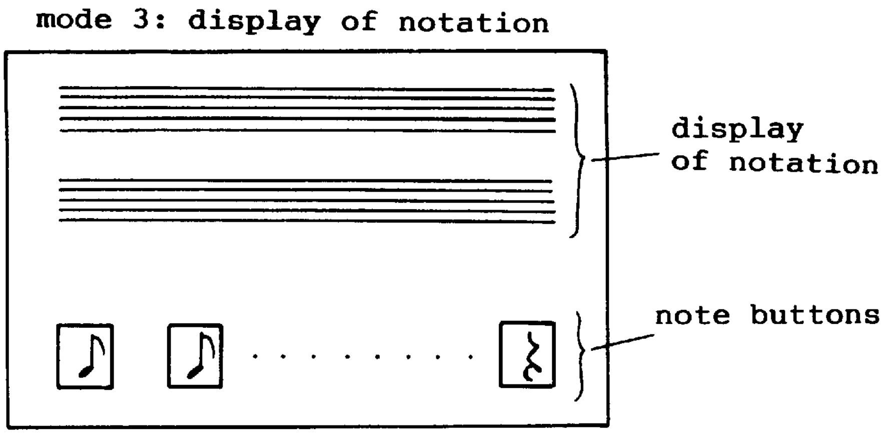
FIG. 9 is a diagram showing an image for notation display mode on the display unit.

When a selection button for "mode 3: display of notation" is selected from "<initial image: mode selection>" by touching it, an image for "<mode 3: display of notation>" as shown in FIG. 9, for example, performance data stored in the external memory 209 is read to display a notation and various musical note buttons.

When a player's performance is stored in the external memory 209 by "<mode 1: automatic performance>" and displayed by mode 3, his/her performance can be viewed as a notation.

In this case, when a desired note button is touched by finger and the finger is moved to a desired position on the staff while touching, the note is affixed at that position. By repeating this operation, desired music data can be created and stored in the external memory 209.

Figure 10:
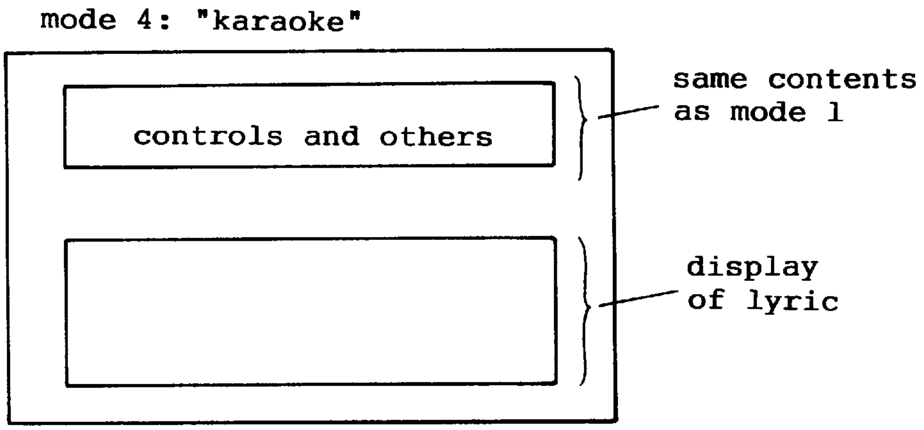
FIG. 10 is a diagram showing an image for "karaoke" performance mode on the display unit.

When a selection button for "mode 4: karaoke" is selected from "<initial image: mode selection>" by touching it, an image for "<mode 4: "karaoke>" as shown in FIG. 10, for example, the same control selection buttons and selection button for "others" as those of "<mode 1: automatic performance>" are displayed and performance data stored in the external memory 209 and lyric data for displaying lyric lines are displayed for the performance data stored in the external memory 209. When a voice is input from the external microphone 213 and the actuator is controlled to drive the keyboard in accordance with the performance data, a "karaoke" performance can be given. At this point, various effects can be added to the input voice by the effect unit 212.

Figure 11:
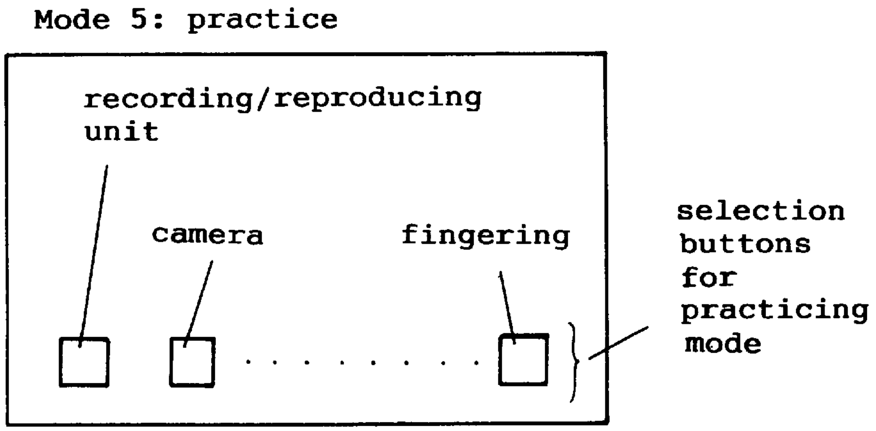
FIG. 11 is a diagram showing an image for practicing mode on the display unit.

When a selection button for "mode 5: practice" is selected from "<initial image: mode selection>" by touching it, an image for "<mode 5: practice>" as shown in FIG. 11, for example, selection buttons for practicing modes such as "camera mode", "recording/reproducing unit mode" and "fingering mode" are displayed. In the "camera mode", an image picked up by a digital video camera (image pick-up device) 215 is directly displayed on the LCD 211 so that a scene within a dead angle from the piano main body 1, such as students in the classroom and a conductor at a concert hall can be seen.

In the "recording/reproducing unit mode", an image picked up by the image pick-up device 215 is recorded in the recording/reproducing unit 214 and an image recorded in this recording/reproducing unit 214 is displayed on the LCD 211 so that a player's performance can be seen and a model performance picked up separately can be seen. When a player's performance and a model performance are displayed in such a manner that they are superimposed upon each other, defects in his/her performance can be easily identified and further the image of his/her performance and the image of a model performance are compared and recognized so that his/her performance can be evaluated from the result of comparison.

In addition, by reading an audio signal and the like recorded separately and producing a sound through the effect unit 212, it is possible to practice playing the keyboard instrument in time to the performance of an orchestra recorded on a compact disk, for example.

In the "fingering mode", the keyboard 10 is displayed and a key to be pressed and a finger for pressing the key are displayed along with music to be practiced.

When a selection button for "mode 6: communication" is selected from "<initial image: mode selection>" by touching it, performance data (MIDI data), image signals, voice signals or audio signals are transmitted to and received from an external device through the communication interface 206. For example, when data on a performance which is given at another place and a performance scene are transmitted, music sound signals are generated by the sound source unit 210 based on the performance data and the performance scene is displayed on the LCD 211, an ensemble performance with players at a separate place is possible.

Figure 12:
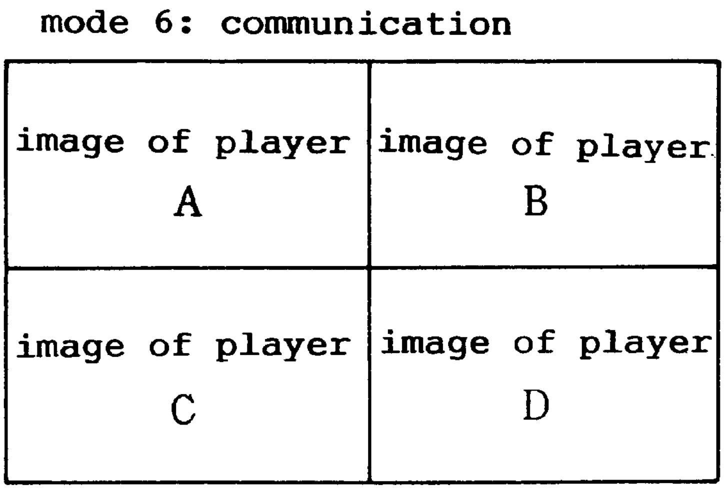
FIG. 12 is a diagram showing an image for communication mode on the display unit.

In this ensemble performance, images of players, for example, player A, player B, player C and player D, are displayed on the divided sections of the screen for displaying "<mode 6: communication>" as shown in FIG. 12, whereby each player playing at a different place can be seen.

Figure 13:
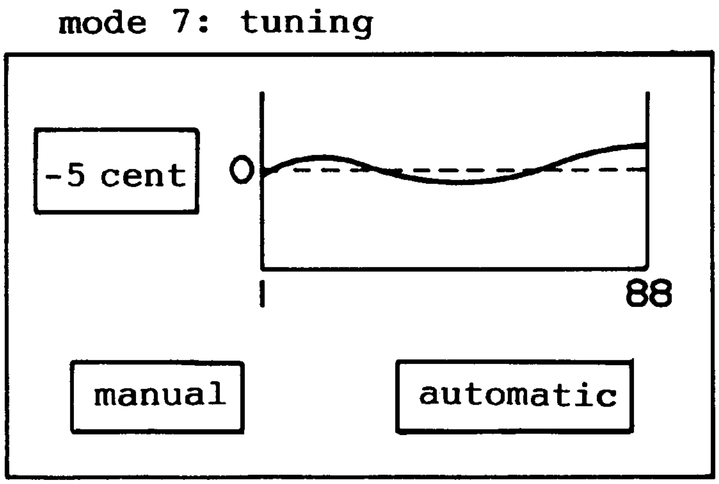
FIG. 13 is a diagram showing an image for tuning mode on the display unit.

When a selection button for "mode 7: tuning" is selected from "<initial image: mode selection>" by touching it, an image for "mode 7: tuning" as shown in FIG. 13, for example, selection buttons for "manual mode" and "automatic mode" are displayed. In the "manual mode", a player presses the keys of the keyboard 10 one at a time, a string is struck by pressing the key to produce a sound, and the sound is picked up by the internal microphone 217. The pitch of the sound is detected by a known technique and compared with the standard pitch of each key recorded in the ROM 202, and the pitch difference is displayed as "−5 cent" numerically. Thus, tuning is carried out.

In the "automatic mode", all the keys are automatically driven by the actuator and the pitch of each key is compared with the standard pitch of each key stored in the ROM 202 as in the "manual mode" to obtain the pitch difference which is displayed by a broken line graph plotting key numbers on the axis of abscissa. Thus, tuning is carried out.

Although the difference between the detected pitch and the standard pitch is displayed in the above case, other information on the detected pitch may be displayed numerically or by a broken line graph.

Further, the above display unit 80 can display the images of a plurality of selection modes on the divided sections of the screen by selecting the plurality of selection modes on the screen displaying "<initial image: mode selection>" at the same time.

Figure 14:
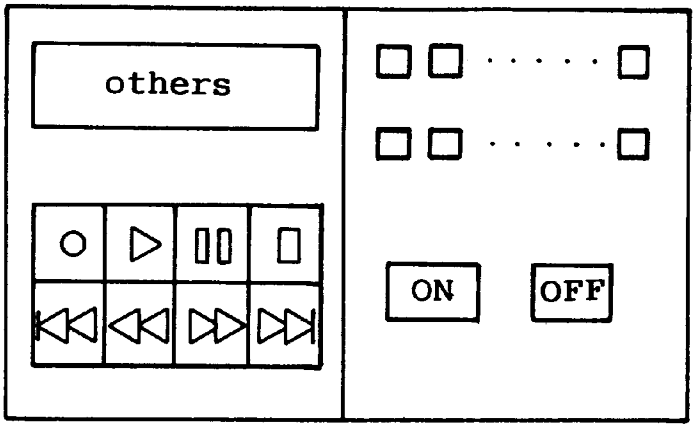
FIG. 14 is a diagram showing the simultaneous display of images for automatic performance mode and silent performance mode on the display unit.

FIG. 14 shows a case where "mode 1" and "mode 2", for example, are specified at the same time on the screen displaying "<initial image: mode selection>". Thereby, "settings" for "automatic performance" and "settings" for "silent performance" can be made simultaneously, thereby improving operation ease.

Figure 15:
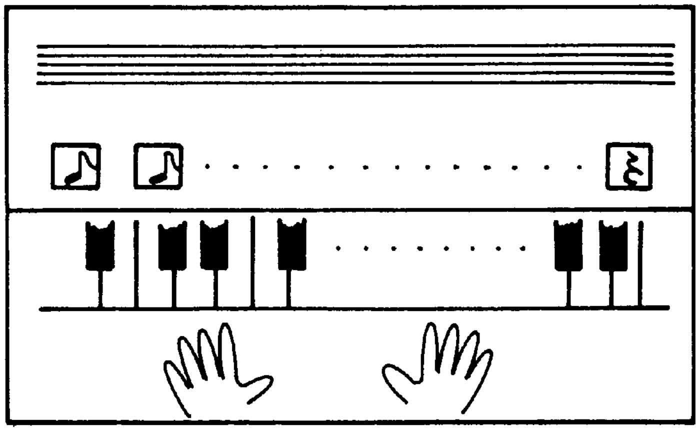
FIG. 15 is a diagram showing the simultaneous display of images for notation display mode and practicing mode on the display unit.

FIG. 15 shows a case where "mode 3" and "mode 5", for example, are specified at the same time on the screen displaying "<initial image: mode selection>". Thereby, the "notation" of music to be practiced and images for "fingering" and "model performance" of this music can be displayed simultaneously, thereby improving the effect of practicing.

When "mode 3" and "mode 6", for example, are specified at the same time on the screen displaying "<initial image: mode selection>" though not shown, the "notation" of music to be practiced and a performance scene at a different place can be displayed simultaneously, whereby a plurality of images for practicing music can be displayed simultaneously. Thus, the effect of practicing is further improved.

Further, when "mode 3" and "camera mode" of "mode 5" are specified at the same time, the notation of music to be played and a conductor and other players within a dead angle from the piano main body 1 are displayed simultaneously.

In the above-described display unit 80, a switch for returning to the "initial image: mode selection", not shown, is shown in the image of each mode so that the image of each mode can be switched to the initial image by operating this switch.

The images of a plurality of modes are displayed on the divided sections of the screen simultaneously by specifying the plurality of modes on the screen displaying "<initial image: mode selection>". For example, the image of a model performance of "mode 5" can be displayed as the background of the image of the notation of "mode 3" in such a manner that it is superimposed thereupon. In addition, a performance scene at a different place of "mode 6" can be displayed as the background of the image of the notation of "mode 3" in such a manner it is superimposed thereupon.

On the display screen of the display unit 80, the shape, color and location of icons and background displayed can be freely selected by a player, or a plurality of display patterns are prepared and can be freely selected by a player. Thus, the display screen can be customized.

Further, a transparent panel may be placed over the LCD 211 of the display unit 80 and used as a speaker and/or external microphone to provide sound producing and/or pick-up functions to the LCD.

Video images can be recorded and/or reproduced on the display unit 80 by the recording/reproducing unit 214. It is needless to say that still images may be recorded and/or reproduced.

Further, the touch panel 216 is placed over the LCD 211 of the display unit 80 to specify various modes with this touch panel 216. A pointing device such as a mouse may be connected in place of the touch panel and modes may be specified with this pointing device.

Further, in the display of "notation" of "mode 3" or "karaoke" of "mode 4", all the notation/lyric lines of a single tune are not displayed but part of the notation/lyric lines may be displayed and scrolled. Or the colors of the notation (or notes)/lyric lines may be changed to indicate the current location along with the proceeding of music.

In addition, the color of each note/word may be changed in accordance with the playing/singing strength of each note/word.

Figure 16:
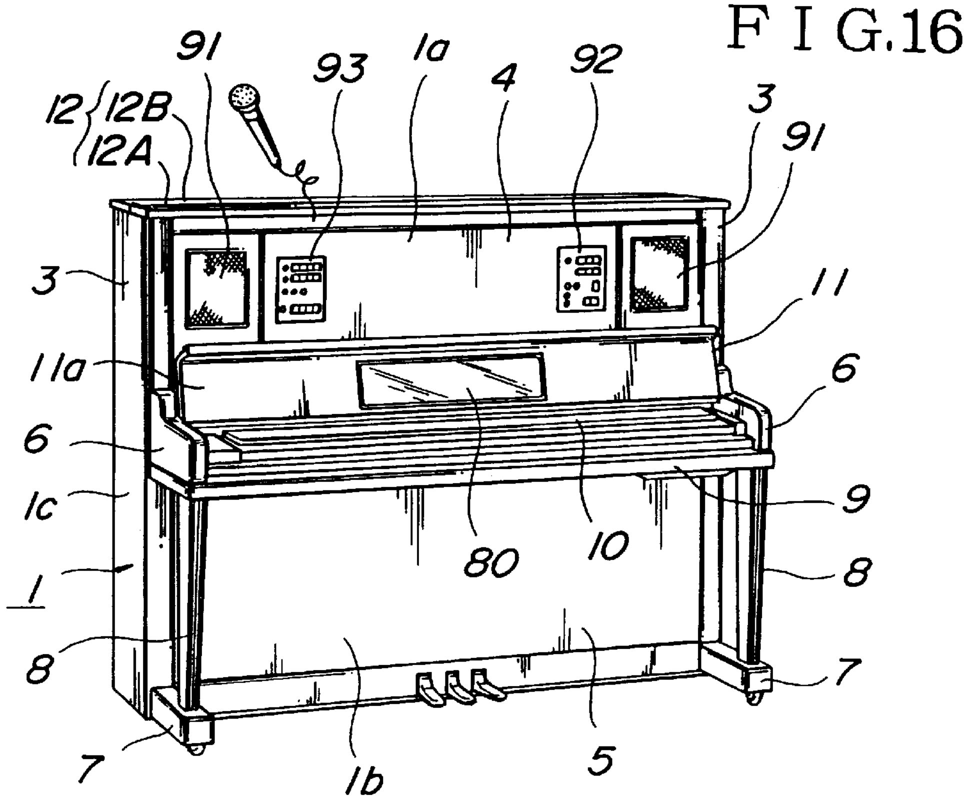
FIG. 16 is a diagram showing a second embodiment of this invention.

FIG. 16 shows a second embodiment of this invention in which the display unit 80 is set in the rear surface 11*a* of the keyboard cover 11. For instance, when a notation recorded on a compact disk is continuously displayed on the display unit 80 through the recording/reproducing unit 93 for multi media such as sound and/or image recording media, a player does not have to turn the sheets of music while playing unlike the prior art, is thereby relieved from the labor of turning the sheets of music and can concentrate on his/her performance. In addition, a music stand is not necessary.

In this case, the display unit 80 not only displays images but also enables editing work such as writing notes on the notation and moving notes using the touch panel, touch pen or mouse.

Figure 17:
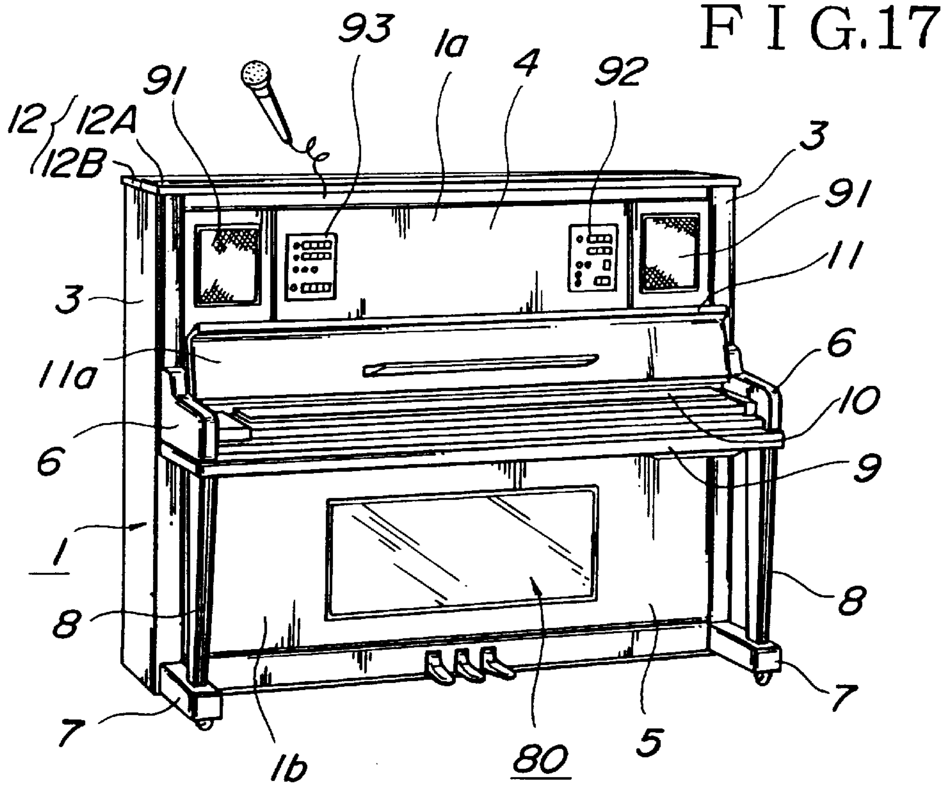
FIG. 17 is a diagram showing a third embodiment of this invention.

FIG. 17 shows a keyboard instrument according to a third embodiment of this invention in which the display unit 80 is set in a central portion of the lower front plate 5 forming the lower front surface 1*b* of the piano main body 1. Thereby, character information and/or images can be displayed on the large screen and the screen can be seen from the front side of the piano main body 1 while sitting on the floor at ease at the time of an automatic performance.

Figure 18:
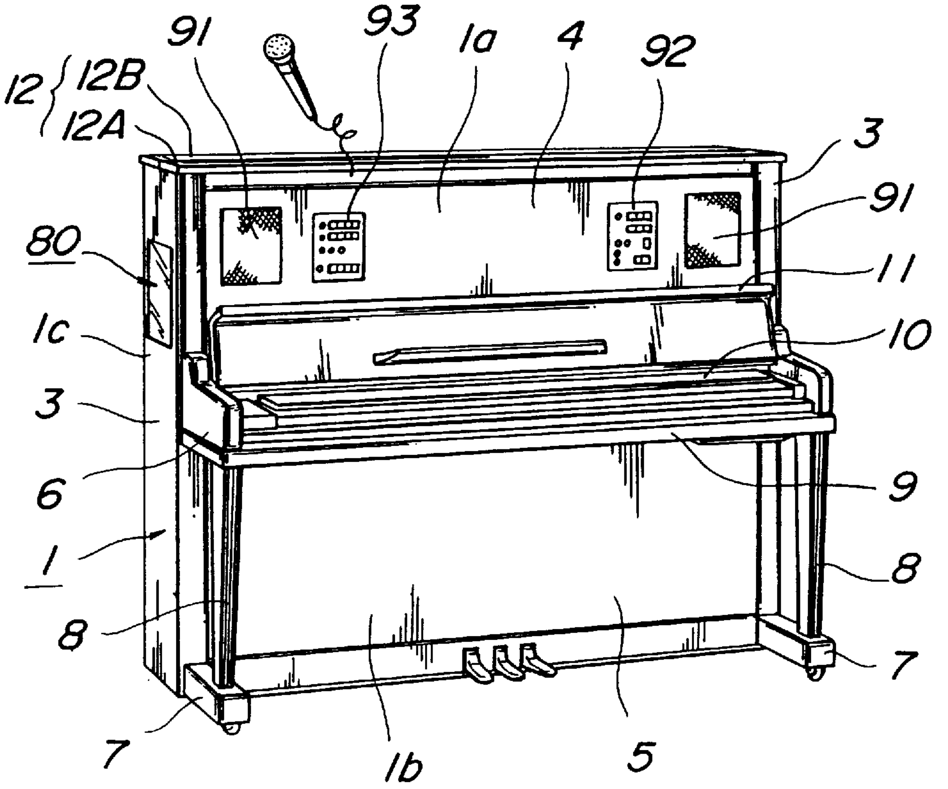
FIG. 18 is a diagram showing a fourth embodiment of this invention.

FIG. 18 shows a keyboard instrument according to a fourth embodiment of this invention in which the display unit 80 is set in a upper portion of the carrier plate 3 forming the side surface 1*c* of the piano main body 1. Thereby, the screen can be seen from the side surface 1*c* side of the piano main body 1 while sitting on the floor at ease at the time of an automatic performance.

Figure 19:
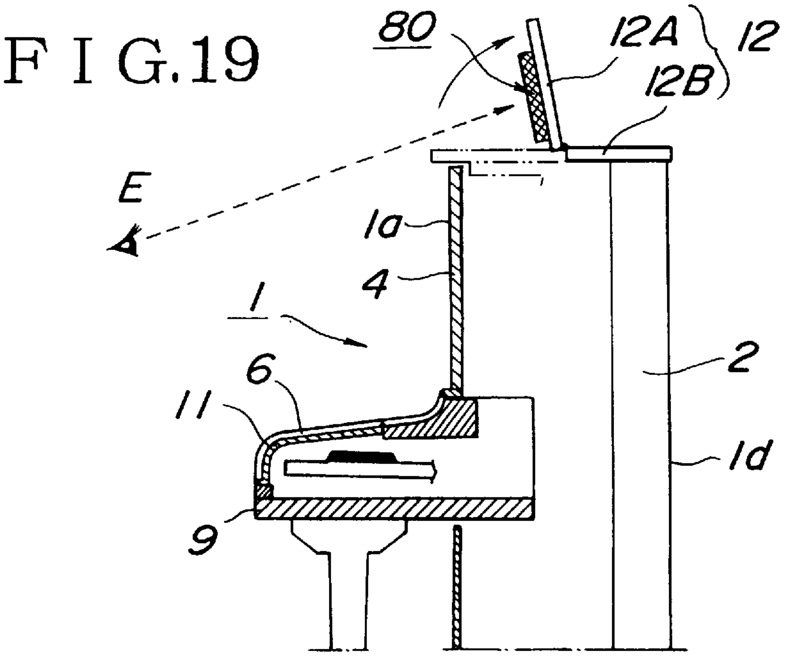
FIG. 19 is a schematic sectional view of a fifth embodiment of this invention.

FIG. 19 shows a keyboard instrument according to a fifth embodiment of this invention in which the display unit 80 is set in the rear surface of the openable front roof plate 12A of the roof plate 12 of the piano main body 1. In this case, by adjusting the open state of the front roof plate 12A such that it faces slightly downward when the display unit 80 is in use, it is made easy to see the display unit 80 from eyes E. When the front roof plate 12A is in a closed state as shown by two-dot broken lines in FIG. 19, that is, the display unit 80 is not in use, the display unit 80 can be stored in the garret of the piano main body 1 to prevent the display unit 80 from being stained with dust and dirt.

Figure 20:
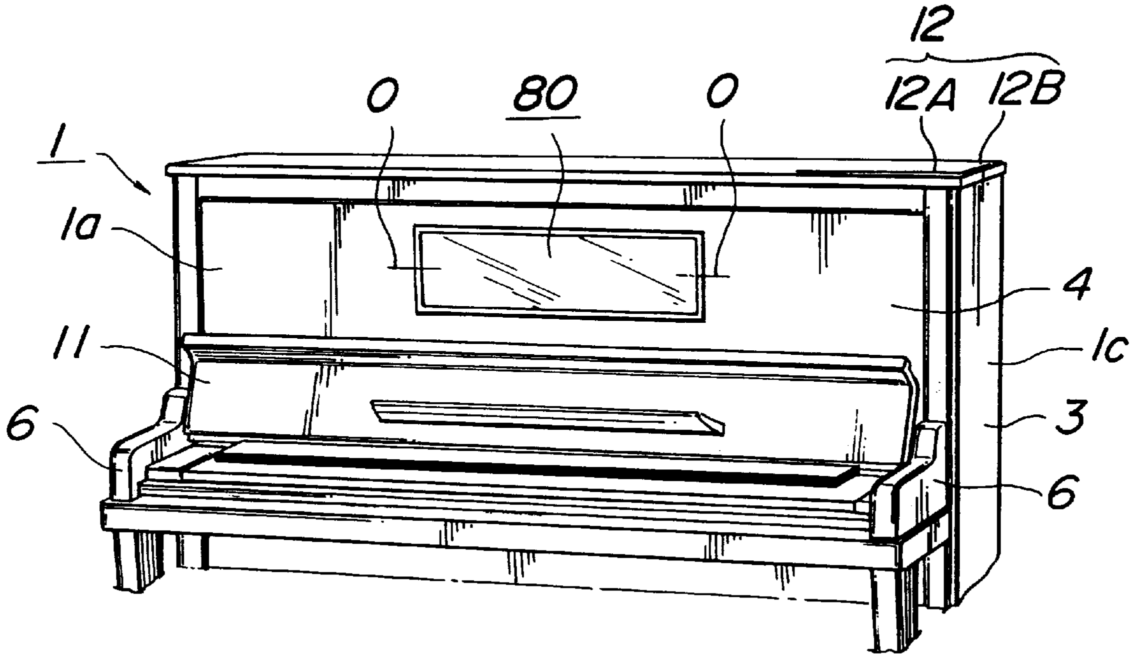
FIG. 20 is a diagram showing a sixth embodiment of this invention.
Figure 21:
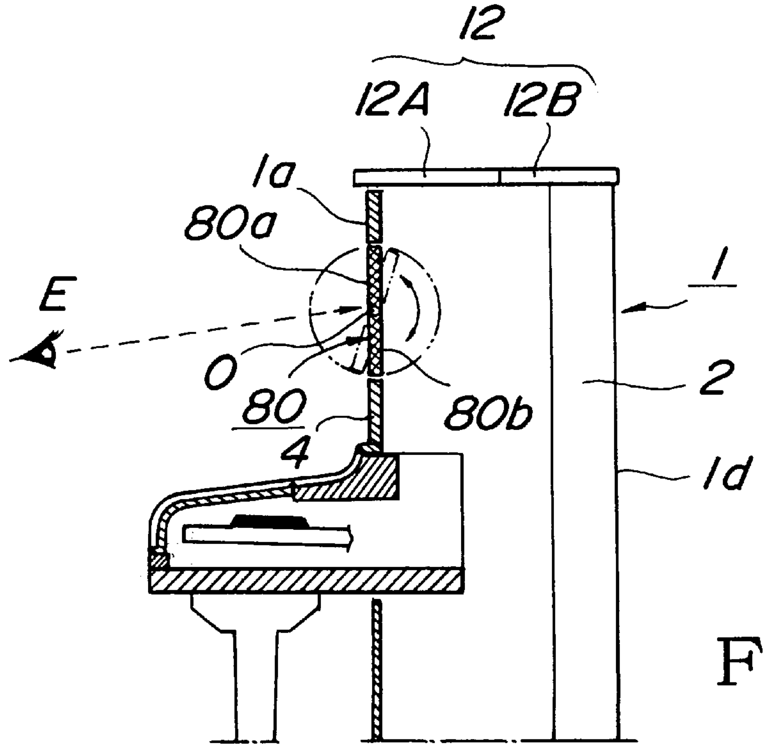
FIG. 21 is a schematic sectional view of the sixth embodiment of this invention.

FIG. 20 and FIG. 21 show a keyboard instrument according to a sixth embodiment of this invention. When the display unit 80 is set in the upper front plate 4 of the piano main body 1 like the above first embodiment of this invention, it is installed in such a manner that it can rotate at 180° around the axis O—O. In this case, by applying the same coating as that for the surface of the upper front plate 4 to the rear surface 80*b* opposite to the display surface 80*a* of the display unit 80, the outer appearance of the display unit 80 not in use is made the same as the surface of the upper front plate 4.

Figure 22:
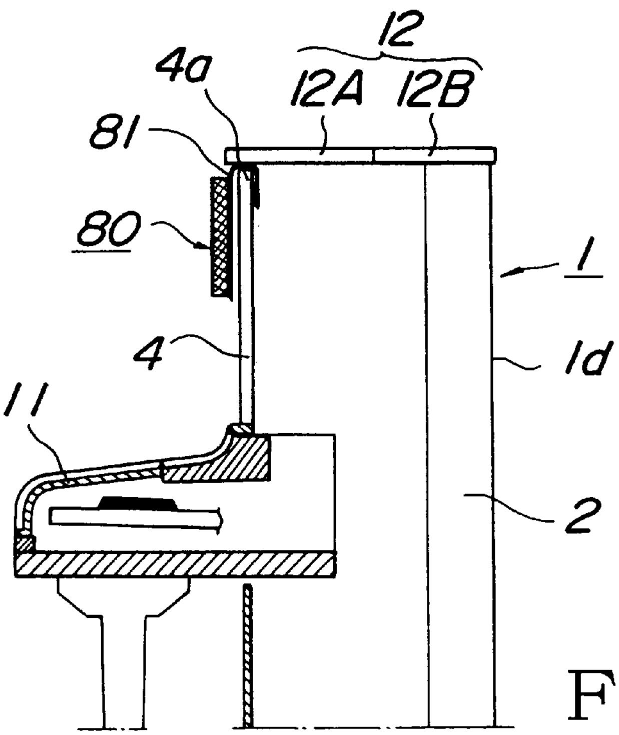
FIG. 22 is a schematic sectional view of a seventh embodiment of this invention.

FIG. 22 shows a keyboard instrument according to a seventh embodiment of this invention. When the display unit 80 is set on the upper front surface 1*a* of the piano main body 1 like the first embodiment, it is detachably hung on an upper end portion 4*a* of the upper front plate 4 by a hanging member 81.

Figure 23:
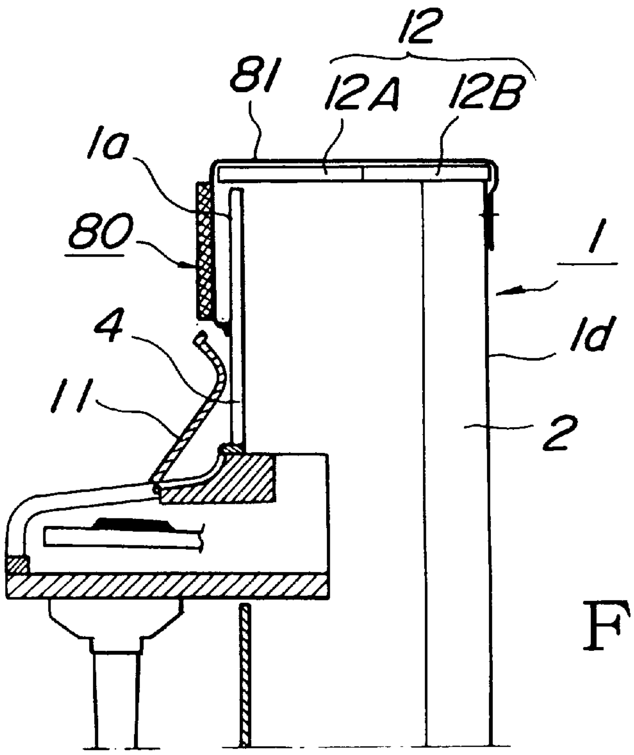
FIG. 23 is a schematic sectional view of an eighth embodiment of this invention.

FIG. 23 shows a keyboard instrument according to an eighth embodiment of this invention. When the display unit 80 is attached to the upper front surface 1*a* of the piano main body 1 by the hanging member 81 like the above seventh embodiment, the hanging member 81 is detachably hung on a top surface portion of the roof plate 12 or screwed into the support frame 2 on the rear surface 1*d* of the piano main body 1. In this case, the display unit 80 can be installed on the rear surface 1*d* side of the piano main body 1 by the hanging member 81, whereby the display unit 80 can be turned toward a player or people other than the player such as a student learning in a music class.

FIG. 24 shows a keyboard instrument according to a ninth embodiment of this invention. When the display unit 80 is installed on the rear surface 11*a* of the keyboard cover 11 in an open state like the above second embodiment of this invention, it is detachably hung on an upper end portion of the keyboard cover 11 by a hanging member 81.

FIG. 25 shows a keyboard instrument according to a tenth embodiment of this invention. When the display unit 80 is installed on the lower front surface 1*b* of the piano body 1 like the above third embodiment of this invention, it is detachably hung on an upper end portion 5*a* of the lower front plate 5 by the hanging member 81.

FIG. 26 and FIG. 27 show a keyboard instrument according to an eleventh embodiment of this invention. When the display unit 80 is installed on the upper front surface 1*a* of the piano main body 1 like the above first, sixth, seventh and eighth embodiments of this invention, as shown in FIG. 26, it is hung by the hanging member 81 fixed on the roof plate 12 in such a manner that it can rotate at about 270° and placed on the roof plate 12 when it is not in use as shown in FIG. 27.

Figure 28:
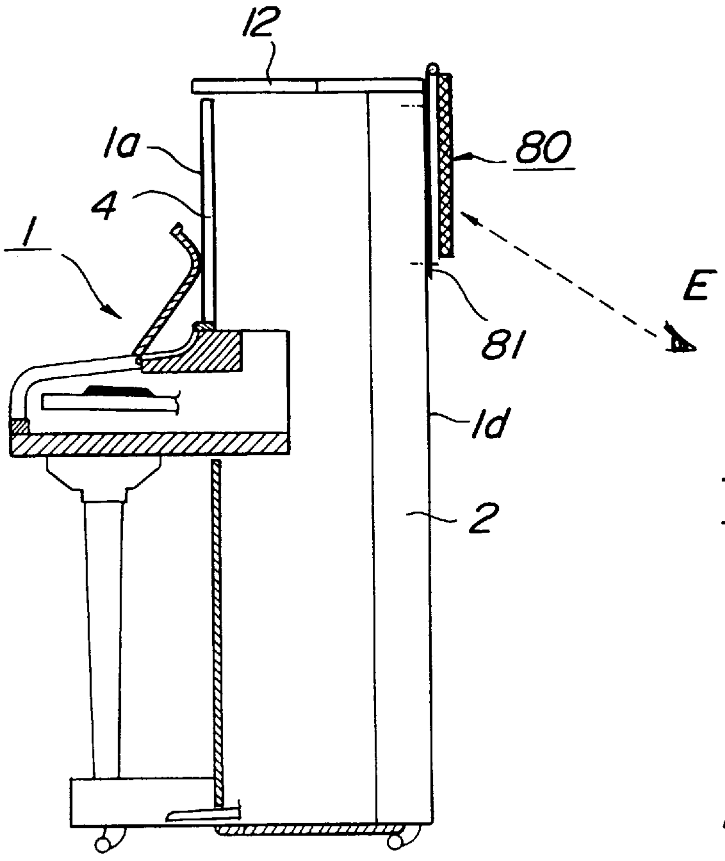
FIG. 28 is a schematic sectional view of a twelfth embodiment of this invention.
Figure 29:
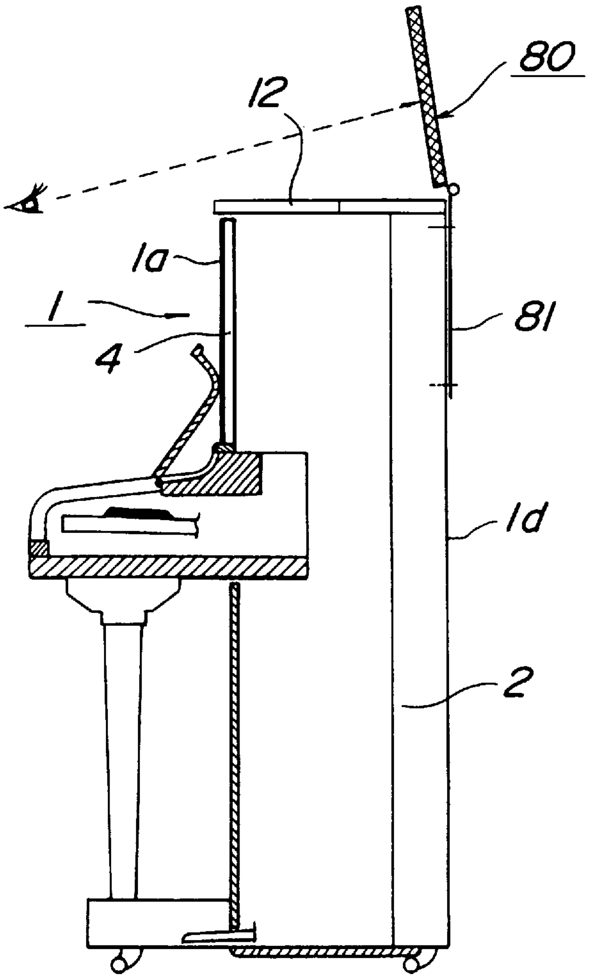
FIG. 29 is a schematic sectional view of the upright piano in another use state.

FIG. 28 and FIG. 29 show a keyboard instrument according to a twelfth embodiment of this invention. The display unit 80 is installed on the rear surface 1*d* of the piano main body 1. As shown in FIG. 28, the display unit 80 is hung by the hanging member 81 fixed on the support frame 2 on the rear surface 1*d* of the piano main body 1 in such a manner that it can rotate at an angle of 180 to 220° so that it can be seen from the rear surface 1*d* side of the piano main body 1 while sitting on the floor at ease at the time of an automatic performance. When a player plays by himself/herself, as shown in FIG. 29, the display unit 80 is moved to face slightly downward above the roof plate 12 so that it can be used in the same manner as in the above fifth embodiment. Thereby, the display unit 80 can be turned toward a player or people other than the player such as students learning in a music class like the above eighth embodiment.

Figure 30:
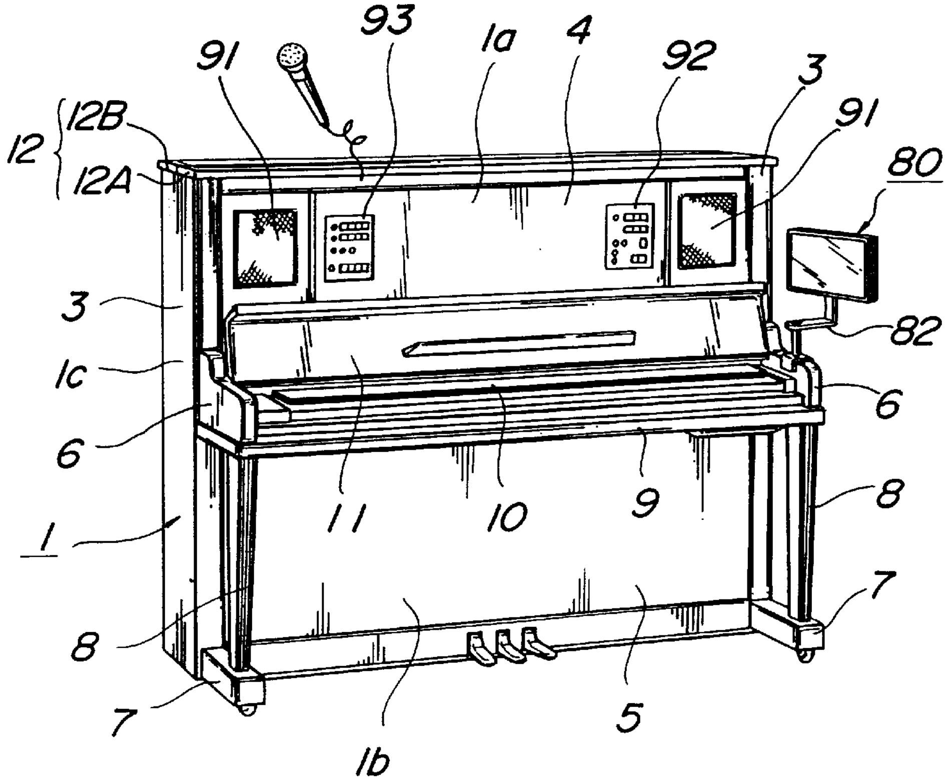
FIG. 30 is a diagram showing a thirteenth embodiment of this invention.

FIG. 30 shows a keyboard instrument according to a thirteenth embodiment of this invention. The display unit 80 is detachably installed on the bracket 6 of the piano main body 1 through a support member 82.

Figure 31:
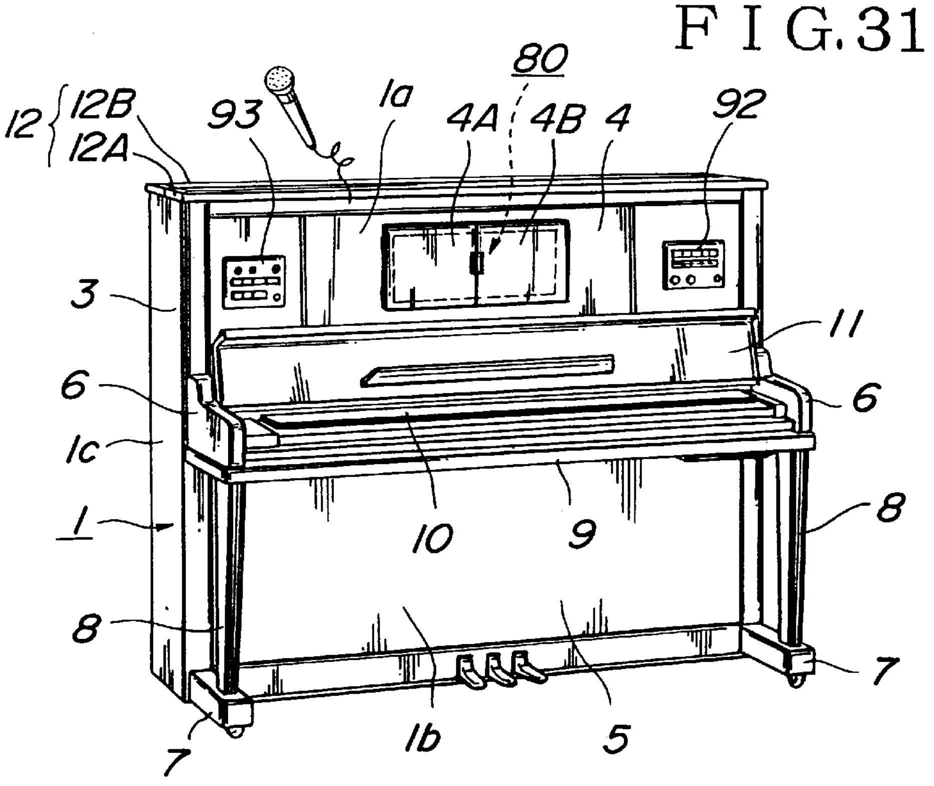
FIG. 31 is a diagram showing a fourteenth embodiment of this invention.
Figure 32:
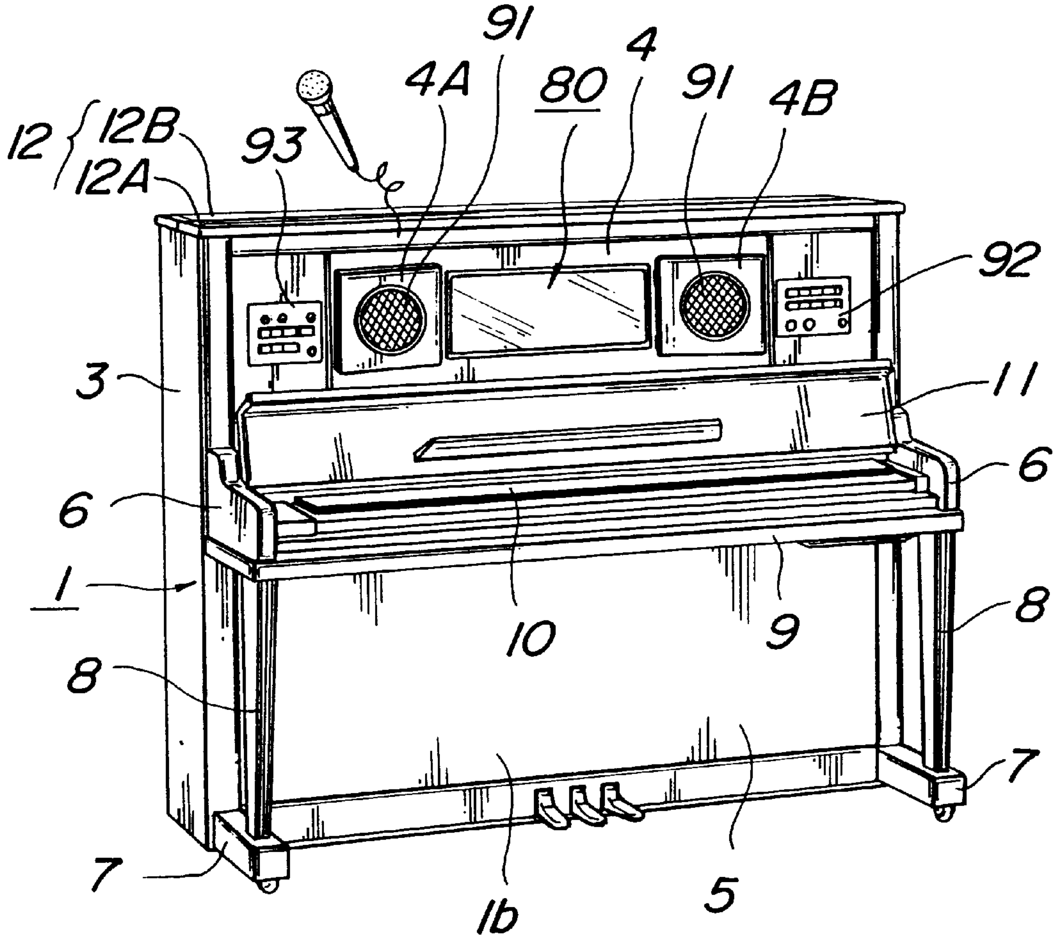
FIG. 32 is a diagram showing the upright piano in use.

FIG. 31 and FIG. 32 show a keyboard instrument according to a fourteenth embodiment of this invention. As shown in FIG. 31, when the display unit 80 is set in the upper front plate or the lower front plate 5 of the piano main body 1, for example, in the upper front plate 4 in this case, it can be covered by a pair of right and left doors 4A, 4B which can open on hinges and exposed by opening the doors 4A, 4B as shown in FIG. 32 when it is used. In this case, speakers 91, 91 can be set in the rear sides of the doors 4A, 4B.

Figure 33:
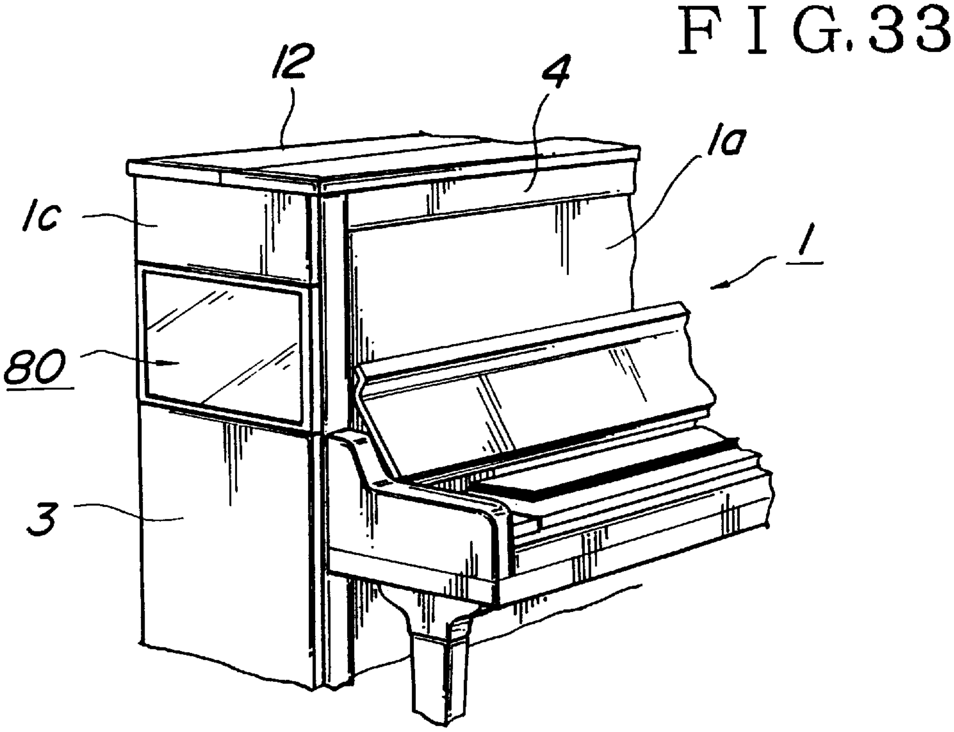
FIG. 33 is a schematic sectional view of a fifteenth embodiment of this invention.
Figure 34:
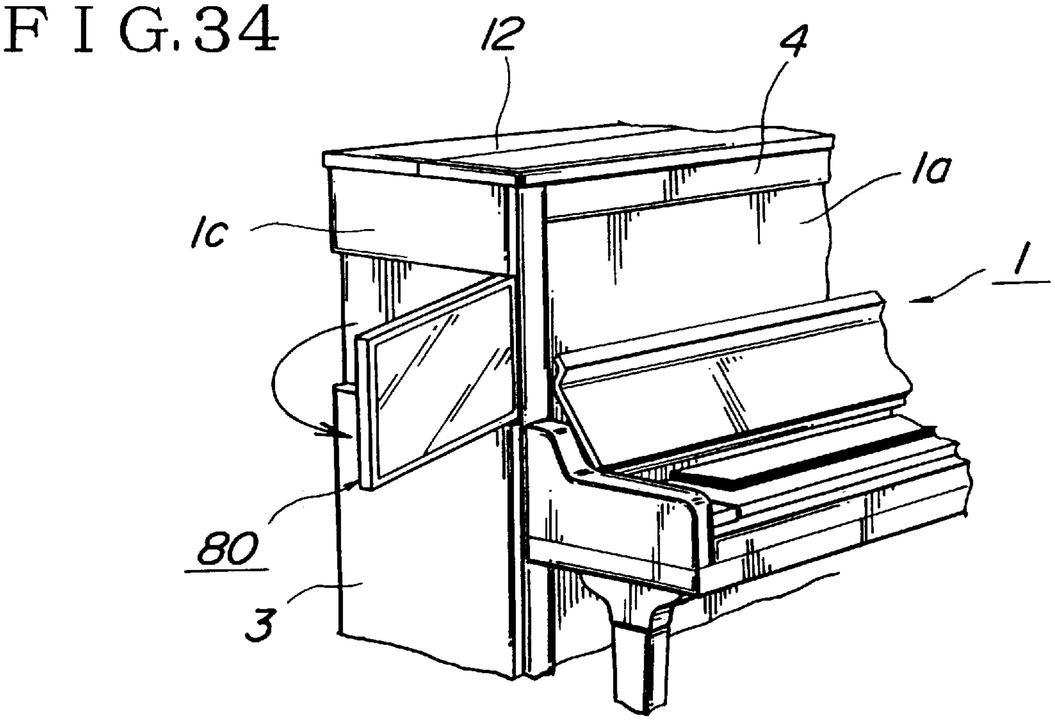
FIG. 34 is a schematic sectional view of the upright piano in another use state.

FIG. 33 and FIG. 34 show a keyboard instrument according to a fifteenth embodiment of this invention. The display unit 80 set in the carrier plate 3 forming the side surface 1*c* of the piano main body 1 as shown in the fourth embodiment can be rotated toward the front side.

When the display unit 80 is directed to an audience as shown in the twelfth embodiment (FIG. 28) and thirteenth embodiment (FIG. 30) of this invention, the image of a player playing is picked up by a digital video camera (image pick-up device) 94 and displayed on the display unit 80. In this case, the keyboard instrument of this invention is suitable for practicing music.

When the image of the player playing is picked up from above the piano main body 1, by rotating the picked-up image at 180° and then inverting it horizontally, it is made easy to see the image.

When the image of a player playing is picked up, not only a front image but also a side image of the fingers of the player can be picked up using two digital video cameras (image pick-up devices) 94. In this case, these images are displayed on the divided sections of the screen of the display unit 80 simultaneously.

In other words, since this invention is constituted as described above, the piano main body 1 is provided with the display unit 80 which is an liquid crystal display and a notation stored in a compact disk, for example, is continuously displayed on the display unit 80 through the recording/reproducing unit 93 for multi media such as image recording media, whereby a player does not have to turn the sheets of music unlike the prior art, is thereby relieved from the labor of turning the sheets of music and can concentrate on his/her performance. In addition, a music stand is not necessary, and his/her original performance can be expressed as a notation and can be displayed on the display unit instantaneously.

When the piano is played ensemble with an orchestra performance stored in a compact disk by reproducing it from the speakers 91, 91 through the recording/reproducing unit 93 for multi media such as music and/or image recording media, the timing of a baton is easily grasped and a performance can be given with concert-hall presence when practicing by displaying the image of a conductor on the display unit 80. Thus, an ensemble performance function can be improved.

Further, by displaying an image and lyric for a “karaoke” performance stored in a compact disk on the display unit 80 through the “karaoke” reproduction unit 94 or a personal computer, a player can play while singing or practice by himself/herself with ease.

Moreover, by installing the display unit 80 on the piano main body 1 detachably, the display unit 80 can be repaired with ease when it malfunctions.

The display unit 80 to be set in the piano main body 1 is set in the piano main body 1 at one site in the above embodiments. It may be set in the piano main body 1 at a plurality of sites as required.

Further, a digital video camera may be set in the piano main body 1 or detachably installed on the piano main body 1.

While an upright piano (vertical keyboard instrument) has been described as a keyboard instrument, it is needless to say that this invention can be applied to a horizontal keyboard instrument (grand piano) or an electronic keyboard instrument for producing musical sounds electrically by means of an electronic sound source as other examples of the keyboard instrument.

Further, the music and/or image recording media are not limited to compact disks but may be any recording media such as floppy disks, optical magnetic disks and memory cards.

As is evident from the above description, since the instrument main body is provided with a flat panel-like display unit for displaying character information and/or images, this invention enables character information and/or images to be displayed on a large screen.

Since a notation is continuously displayed on the display unit, a player does not have to turn the sheets of music any longer, is relieved form the labor of turning the sheets of music and can concentrate on his/her performance. In addition, a music stand is not necessary, and his/her original performance can be expressed as a notation and displayed on the display unit instantaneously.

Moreover, when the speakers and the recording/reproducing unit for multi media such as sound and/or image recording media are connected to the display unit and the piano is played ensemble with an orchestra performance stored in a compact disk by reproducing it from the speakers, the timing of a baton is easily grasped and a performance can be given with concert-hall presence when practicing by displaying the image of a conductor on the display unit. Thus, an ensemble performance function can be improved.

Further, since the microphone and the "karaoke" reproduction unit are provided, a player can play while singing or practice by himself/herself by displaying an image and lyric stored in a compact disk, for example, on the display unit.

Since the display unit is detachably installed on the piano main body, it can be repaired easily when it malfunctions.

FIG. 1 microphone and "karaoke" reproduction unit
1*a* upper front surface
80 display unit (liquid crystal display)
92 recording/reproducing unit
3 carrier plate
91 speaker
4 upper front plate
11 keyboard cover
6 bracket
94 image pick-up device
1 instrument main body (piano main body)
1*b* lower front surface
5 lower front plate

FIG. 5

| | |
|---|---|
| 216 touch panel | 204 operation panel |
| 205 sensor interface | 215 digital camera |
| 214 recording/reproducing unit | |
| 206 communication interface | 207 actuator interface |
| 208 motor drive circuit | 209 external memory |
| 210 sound source circuit | 212 effect unit |

FIG. 6

<initial image: mode selection> mode selection buttons others

FIG. 7

<mode 1: automatic performance>
others music selection volume
temp transposition
recording reproduction stop controls

FIG. 8

<mode 2: silent>

| | | |
|---|---|---|
| piano | organ | tone selection buttons |
| hall 1 | hall 2 | effect selection buttons |

ON/OFF buttons of silent mode

FIG. 9

<mode 3: display of notation>
display of notation
note buttons

FIG. 10

<mode 4: "karaoke">
controls and others same contents as mode 1
display of lyric

FIG. 11

<mode 5: practice>
recording/reproducing unit camera fingering selection buttons for practicing mode

FIG. 12

<mode 6: communication>
image of player A image of player B
image of player C image of player C

FIG. 13

<mode 7: tuning>
−5 set
manual automatic

FIG. 14

<simultaneous display of mode 3 and mode 5> others

FIG. 15

<simultaneous display of mode 1 and mode 2>

What is claimed is:

1. A keyboard instrument comprising:

an instrument main body having a keyboard; and a display unit disposed on the instrument main body, wherein the display unit is operatively coupled to the instrument which is controllable by touching selected areas on the display unit; and wherein the display unit can display the progression of a plurality of performances of players by receiving transmission of image signals.

2. The keyboard instrument of claim 1, wherein the image of each player is displayed on divided sections of the display unit whereby each player playing at a different location can be seen on the display unit.

3. A keyboard instrument comprising:

an instrument main body having a keyboard;

a string striking unit operatively coupled to the keyboard;

a flat panel-like display unit, disposed on the instrument main body, for displaying information; and sound pick-up means operatively coupled to the display unit for picking up string striking sounds of the string striking unit;

wherein the display unit displays information regarding the pitch of the string striking sounds picked up by the sound pick-up means;

wherein the information displayed on the display unit includes a numerical display of the pitch difference between the sound picked-up by the sound pick-up means and a standard pitch sound for each key.

4. A keyboard instrument comprising:

an instrument main body having a keyboard;

a string striking unit operatively coupled to the keyboard;

a flat panel-like display unit, disposed on the instrument main body, for displaying information; and sound pick-up means operatively coupled to the display unit for picking up string striking sounds of the string striking unit;

wherein the display unit displays information regarding the pitch of the string striking sounds picked up by the sound pick-up means;

wherein the information displayed on the display unit further comprises a graph representing the difference between the sound picked-up by the sound pick-up means and a standard pitch sound.

* * * * *